(12) United States Patent
Aybay et al.

(10) Patent No.: US 8,705,500 B1
(45) Date of Patent: Apr. 22, 2014

(54) METHODS AND APPARATUS FOR UPGRADING A SWITCH FABRIC

(75) Inventors: Gunes Aybay, Los Altos, CA (US); Anurag Agrawal, Santa Clara, CA (US); Jean-Marc Frailong, Los Altos, CA (US); Fuguang Shi, Saratoga, CA (US); Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 265 days.

(21) Appl. No.: 12/613,313

(22) Filed: Nov. 5, 2009

(51) Int. Cl.
*H04L 12/50* (2006.01)

(52) U.S. Cl.
USPC ............ 370/338; 370/386; 370/388; 370/411

(58) Field of Classification Search
None
See application file for complete search history.

(56) References Cited

U.S. PATENT DOCUMENTS

| | | | |
|---|---|---|---|
| 4,722,603 | A | 2/1988 | Graebner et al. |
| 5,138,615 | A | 8/1992 | Lamport et al. |
| 5,801,641 | A | 9/1998 | Yang et al. |
| 5,926,473 | A | 7/1999 | Gridley |
| 5,987,028 | A | 11/1999 | Yang et al. |
| 5,991,295 | A | 11/1999 | Tout et al. |
| 6,049,542 | A * | 4/2000 | Prasad ........................ 370/386 |
| 6,075,773 | A | 6/2000 | Clark et al. |
| 6,243,388 | B1 | 6/2001 | Mussman et al. |
| 6,539,027 | B1 | 3/2003 | Cambron |
| 6,614,236 | B1 | 9/2003 | Karam |
| 6,636,511 | B1 | 10/2003 | Roy et al. |
| 6,678,268 | B1 | 1/2004 | Francis et al. |
| 6,704,307 | B1 | 3/2004 | Graves et al. |

(Continued)

FOREIGN PATENT DOCUMENTS

EP     1 892 905     2/2008

OTHER PUBLICATIONS

Electronic design, "Optimized Interconnect Eliminates Limits in Orthogonal Architectures" [online] [originally retrieved on Nov. 5, 2008] Retrieved from the Internet: <URL: http://electronicdesign.com/Articles/Print.cfm?AD-1&ArticleID=13277>, (9 pgs).

(Continued)

*Primary Examiner* — Kibrom T Hailu
*Assistant Examiner* — Zewdu A Beyen
(74) *Attorney, Agent, or Firm* — Cooley LLP

(57) ABSTRACT

A method includes installing an interface card having a first module of a switch fabric and a second module of the switch fabric, and an interface card having a third module of the switch fabric in a first chassis, within a first time period. The switch fabric is in a first configuration and is operable as a three-stage switch fabric after the first time period and before a second time period. The interface card having the third module is removed from the first chassis within the second time period. An interface card having a fourth module of the switch fabric and a fifth module of the switch fabric is installed in the first chassis within the second time period. The switch fabric is in a transitional configuration and is operable as a three-stage switch fabric after the second time period but before the third time period. The interface card having the third module is installed in a second chassis and the first chassis is operatively coupled with the second chassis within the third time period. The switch fabric is in a third configuration and is operable as a five-stage switch fabric after the third time period.

19 Claims, 14 Drawing Sheets

(56) References Cited

U.S. PATENT DOCUMENTS

| | | | |
|---|---|---|---|
| 6,816,486 | B1 | 11/2004 | Rogers |
| 6,868,082 | B1 | 3/2005 | Allen, Jr. et al. |
| 7,038,135 | B1 | 5/2006 | Chan et al. |
| 7,173,931 | B2 | 2/2007 | Chao et al. |
| 7,229,020 | B2 | 6/2007 | Goodison et al. |
| 7,230,947 | B1 | 6/2007 | Huber et al. |
| 7,248,760 | B1 | 7/2007 | Corbalis et al. |
| 7,277,429 | B2 | 10/2007 | Norman et al. |
| 7,280,356 | B2 | 10/2007 | Pfahnl et al. |
| 7,406,038 | B1 * | 7/2008 | Oelke et al. ............ 370/225 |
| 7,408,927 | B2 | 8/2008 | George |
| 7,415,034 | B2 | 8/2008 | Muller et al. |
| 7,496,252 | B1 | 2/2009 | Corbalis et al. |
| 7,505,458 | B2 | 3/2009 | Menon et al. |
| 7,552,262 | B1 | 6/2009 | Turner et al. |
| 7,693,142 | B2 | 4/2010 | Beshai |
| 7,796,501 | B2 * | 9/2010 | Oltman et al. ............ 370/216 |
| 7,899,930 | B1 | 3/2011 | Turner et al. |
| 2002/0064170 | A1 | 5/2002 | Siu et al. |
| 2002/0181455 | A1 | 12/2002 | Norman et al. |
| 2003/0002541 | A1 | 1/2003 | Fowler et al. |
| 2004/0023558 | A1 | 2/2004 | Fowler et al. |
| 2005/0058128 | A1 | 3/2005 | Carson et al. |
| 2005/0275504 | A1 | 12/2005 | Torza |
| 2006/0013207 | A1 | 1/2006 | McMillen et al. |
| 2006/0126610 | A1 | 6/2006 | Ryan et al. |
| 2006/0165085 | A1 | 7/2006 | Konda |
| 2007/0016715 | A1 | 1/2007 | Phelps et al. |
| 2007/0140229 | A1 | 6/2007 | Tang |
| 2007/0153462 | A1 | 7/2007 | Crippen et al. |
| 2008/0044181 | A1 | 2/2008 | Sindhu |
| 2008/0112133 | A1 | 5/2008 | Torudbakken et al. |
| 2008/0130517 | A1 | 6/2008 | Lee et al. |
| 2008/0151863 | A1 | 6/2008 | Lawrence et al. |
| 2008/0159738 | A1 | 7/2008 | Lavranchuk |
| 2008/0186875 | A1 | 8/2008 | Kitani |
| 2008/0192648 | A1 | 8/2008 | Galles |
| 2008/0212472 | A1 | 9/2008 | Musacchio et al. |
| 2008/0214059 | A1 | 9/2008 | Rothermel et al. |
| 2008/0318465 | A1 | 12/2008 | Johnsen et al. |
| 2008/0320117 | A1 | 12/2008 | Johnsen et al. |
| 2009/0003327 | A1 | 1/2009 | Zang et al. |
| 2009/0028229 | A1 | 1/2009 | Cagno et al. |
| 2009/0175281 | A1 | 7/2009 | Higuchi et al. |
| 2010/0002382 | A1 | 1/2010 | Aybay et al. |
| 2010/0165843 | A1 | 7/2010 | Thomas |
| 2010/0165983 | A1 | 7/2010 | Aybay et al. |
| 2010/0165984 | A1 | 7/2010 | Aybay et al. |
| 2011/0243031 | A1 | 10/2011 | Aybay |

OTHER PUBLICATIONS

Jonathan S. Turner et al. "Multirate Clos Networks" IEEE Communications Magazine, Oct. 2003, pp. 1-11.

H. Jonathan Chao et al. "Matching Algorithms for Three-Stage Bufferless Clos Network Switches" IEEE Communications Magazine, Oct. 2003, pp. 46-54.

Gunes Aybay et al., "Front-to-Back Cooling System for Modular Systems with Orthogonal Midplane Configuration" U.S. Appl. No. 12/167,604, filed Jul. 3, 2008, (25 pgs).

Search Report for European Application No. 09170037.7, mailed Dec. 10, 2009, 7 pages.

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

Office Action mailed May 25, 2010 for U.S. Appl. No. 12/345,500 (13 pages).

Office Action mailed Jun. 10, 2010 for U.S. Appl. No. 12/345,502 (24 pages).

Office Action mailed Jun. 8, 2010 for U.S. Appl. No. 12/414,825 (17 pages).

U.S. Appl. No. 12/414,825, filed Mar. 31, 2009 entitled "Distributed Multi-stage Switch Fabric" (72 pgs).

U.S. Appl. No. 12/564,080, filed Sep. 22, 2009 entitled "Systems and Methods for Identifying Cable Connections in a Computing System" (51 pgs).

U.S. Appl. No. 12/752,704, filed Apr. 1, 2010 entitled "Apparatus and Methods Related to the Packaging and Cabling Infrastructure of a Distributed Switch Fabric" (39 pgs).

Office Action mailed Dec. 9, 2010 for U.S. Appl. No. 12/345,500 (15 pages).

Final Office Action mailed Jun. 22, 2011 for U.S. Appl. No. 12/345,500 (16 pages).

Final Office Action mailed Nov. 19, 2010 for U.S. Appl. No. 12/345,502 (26 pages).

Office Action mailed Jul. 18, 2011 for U.S. Appl. No. 12/345,502 (34 pages).

Final Office Action mailed Feb. 22, 2012 for U.S. Appl. No. 12/345,502 (34 pages).

Final Office Action mailed Feb. 15, 2011 for U.S. Appl. No. 12/414,825 (24 pages).

Final Office Action mailed Jun. 21, 2011 for U.S. Appl. No. 12/414,825 (23 pages)—Replaces Feb. 15, 2011 Final Office Action.

Office Action mailed Oct. 26, 2011 for U.S. Appl. No. 12/613,313 (16 pages).

* cited by examiner

METHODS AND APPARATUS FOR UPGRADING A SWITCH FABRIC

RELATED APPLICATIONS

This application is related to co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

BACKGROUND

Embodiments described herein relate generally to switch fabrics and more particularly, to upgrading switch fabrics such as Clos networks.

Clos networks are multi-stage switch networks that provide non-blocking connections between multiple input ports and multiple output ports. A non-blocking network is a network in which a data path through the network can always be established between an idle input port and an idle output port. A three-stage Clos network, for example, has a middle stage connected between an input stage and an output stage. Each stage includes multiple modules. Each input stage module has multiple input ports (n) and is operatively coupled to each middle stage module. Similarly, each output stage module has n output ports and is connected to each middle stage module. A three-stage network is strictly non-blocking if at least 2n−1 middle stage modules are present. In a strictly non-blocking configuration, a data path between an idle input port and an idle output port can always be established without rearranging the existing connections (i.e., the existing connections do not need to be rerouted through the switch fabric). A three-stage network is rearrangeably non-blocking if at least n middle stage modules are present. In a rearrangeably non-blocking configuration, a data path between an idle input port and an idle output port can always be established by rearranging the existing connections.

To accommodate additional input stage modules and/or additional input ports on the input stage modules, additional stages can be added to the switch fabric. For example, a three-stage switch fabric can be upgraded to a five-stage switch fabric. To perform such an upgrade on known switch fabric systems, the switch fabric system is shut down and the upgrade is preformed. Accordingly, users cannot send data and receive data from the switch fabric during the upgrade.

Thus, a need exists for a distributed switch fabric that can expand to include additional inputs/outputs and/or stages without having to shut down during expansion.

SUMMARY

A method includes installing an interface card having a first module of a switch fabric and a second module of the switch fabric, and an interface card having a third module of the switch fabric in a first chassis, within a first time period. The switch fabric is in a first configuration and is operable as a three-stage switch fabric after the first time period and before a second time period. The interface card having the third module is removed from the first chassis within the second time period. An interface card having a fourth module of the switch fabric and a fifth module of the switch fabric is installed in the first chassis within the second time period. The switch fabric is in a transitional configuration and is operable as a three-stage switch fabric after the second time period but before the third time period. The interface card having the third module is installed in a second chassis and the first chassis is operatively coupled with the second chassis within the third time period. The switch fabric is in a third configuration and is operable as a five-stage switch fabric after the third time period.

DETAILED DESCRIPTION

Figure 1:
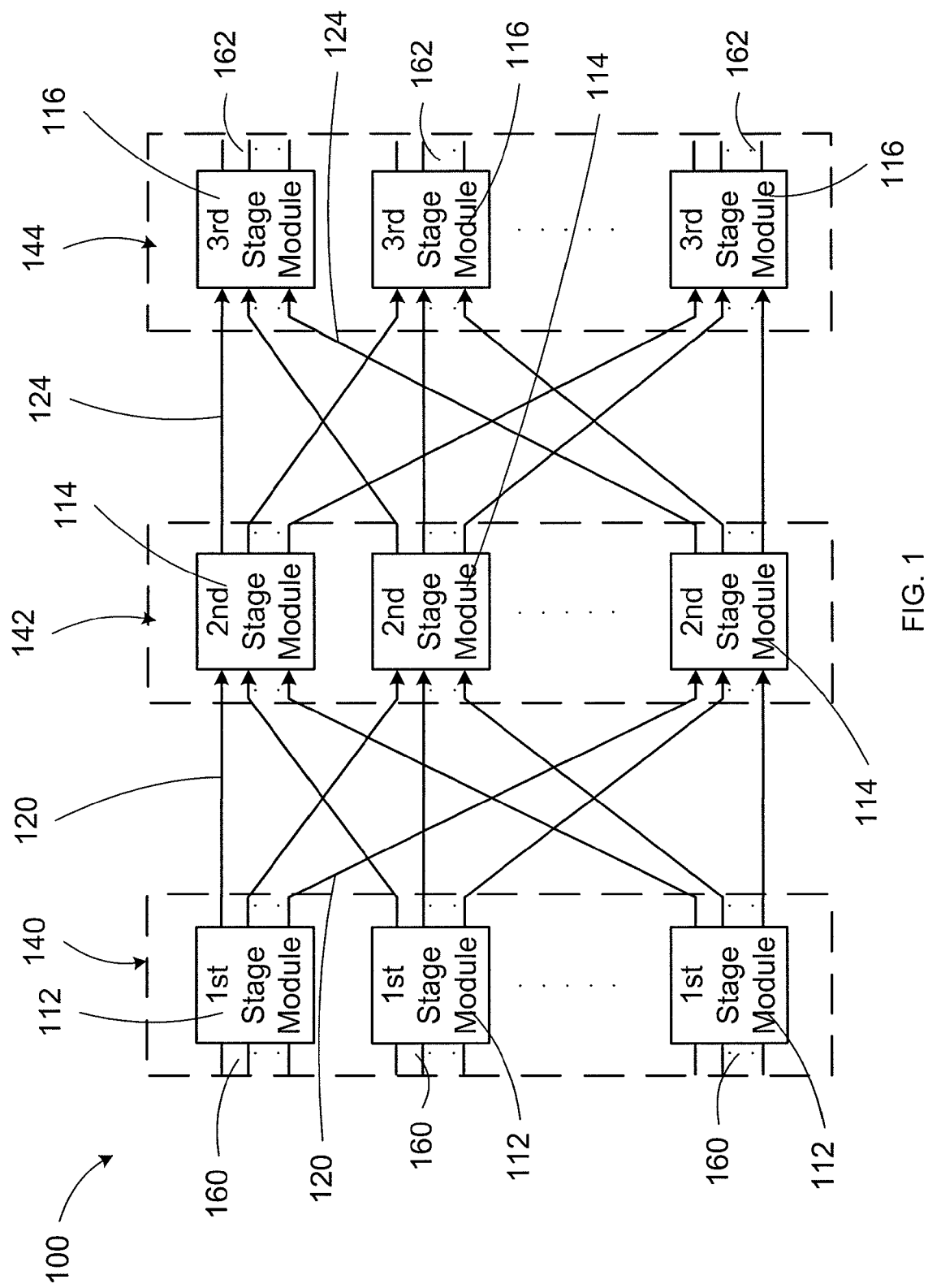
FIG. 1 is a schematic illustration of a switch fabric, according to an embodiment.

In some embodiments, a method includes installing an interface card having a first module of a switch fabric and a second module of the switch fabric, and an interface card having a third module of the switch fabric in a first chassis, within a first time period. The switch fabric is in a first configuration and is operable as a three-stage switch fabric after the first time period and before a second time period. The interface card having the third module is removed from the first chassis within the second time period. An interface card having a fourth module of the switch fabric and a fifth module of the switch fabric is installed in the first chassis within the second time period. The switch fabric is in a transitional configuration and is operable as a three-stage switch fabric after the second time period but before the third time period. The interface card having the third module is installed in a second chassis and the first chassis is operatively coupled with the second chassis within the third time period. The switch fabric is in a third configuration and is operable as a five-stage switch fabric after the third time period.

In such embodiments, the method allows an operator to upgrade a three-stage switch fabric to a five-stage switch fabric. Such a five-stage switch fabric can accommodate a greater number of input/output modules (e.g., access switches) than a three-stage switch fabric. Additionally, such a method allows the upgrade to occur while the switch fabric continues to operate with little to no packet loss due to latency differences during the upgrade.

In some embodiments, a system includes a multi-stage switch defining a single logical entity and having a first configuration, a second configuration and a third configuration. The multi-stage switch includes a first chassis having a module operating as a first stage, a module operating as a second stage and a module operating as a third stage of the multi-stage switch when the multi-stage switch is in the first configuration. The multi-stage switch is configured to operate as a three-stage switch when in the first configuration. The first chassis includes a module operating as the first stage, at least two modules operating collectively as the second stage, and a module operating as the third stage of the multi-stage switch when the multi-stage switch is in the second configuration. The multi-stage switch is configured to operate as a three-stage switch when in the second configuration. The multi-stage switch includes a second chassis having a module operating as the third stage of the multi-stage switch when the multi-stage switch is in the third configuration. The first chassis includes a module operating as the first stage, a module operating as the second stage, a module operating as a fourth stage and a module operating as a fifth stage of the multi-stage switch when the multi-stage switch is in the third configuration. The multi-stage switch is configured to operate as a five-stage switch when in the third configuration. While described above as having at least one module per stage, in other embodiments, the first chassis and/or the second chassis can include any number of modules per stage.

In some embodiments, a method includes sending a first data cell to an access switch via a switch fabric during a first time period. The switch fabric is in a first configuration during the first time period. The switch fabric including a module operating as a first stage, a module operating as a second stage and a module operating as a third stage when in the first configuration. The switch fabric operates as a three-stage switch when in the first configuration. A second data cell is sent to the access switch via the switch fabric during a second time period. The switch fabric is in a second configuration during the second time period. The switch fabric includes a module operating as the first stage, at least two modules operating collectively as the second stage and a module operating as the third stage when in the second configuration. The switch fabric operates as a three-stage switch when in the second configuration. A third data cell is sent to the access switch via the switch fabric during a third time period. The switch fabric is in a third configuration during the third time period. The switch fabric includes a module operating as the first stage, a module operating as the second stage, a module operating as the third stage, a module operating as a fourth stage and a module operating as a fifth stage when in the third configuration. The switch fabric operates as a five-stage switch when in the third configuration.

As used herein, a switch fabric can be a network that includes multiple stages of switches that operatively connect one or more input devices with one or more output devices. A switch fabric can be configured to receive an input signal from an input device, forward the signal through the multiple stages of switches, and output the signal to an output device. Each switch of the multiple stages of switches routes the signal such that the signal arrives at its destination. Such a switch fabric can be referred to, for example, as a Clos network.

As used herein, a module that is within a switch fabric can be any assembly and/or set of operatively coupled electrical components that defines one or more switches within a stage of a switch fabric. An input/output module, for example, can be any assembly and/or set of operatively coupled electrical components configured to send data to and/or receive data from a switch fabric. In some embodiments, for example, an input/output module can be an access switch configured receive data from a server, prepare data to enter into the switch fabric, and send the data to the switch fabric. In some embodiments, a module can include, for example, a memory, a processor, electrical traces, optical connectors, and/or the like.

As used herein, "associated with" can mean included in, physically located with, a part of, operates or functions as a part of, and/or any other meaning of "associated with." For example, a module associated with a first stage of a switch fabric can be said to be included in, physically located with or a part of the first stage of the switch fabric. A module associated with a first stage of a switch fabric can also be said to operate or function as a part of the first stage of the switch fabric.

As used in this specification, the singular forms "a," "an" and "the" include plural referents unless the context clearly dictates otherwise. Thus, for example, the term "a module" is intended to mean a single module or a combination of modules.

The terms "first stage", "second stage" and so on refer to portions, modules or nodes within a switch fabric. In some instances, these temis refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIGS. 1 through 15 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a switch fabric 100, according to an embodiment. Switch fabric 100 is a three-stage, non-blocking Clos network and includes a first stage 140, a second stage 142, and a third stage 144. The first stage 140 includes modules 112. Each module 112 of the first stage 140 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 112 of the first stage 140 is a cell switch. The cell switches are configured to redirect data (e.g., data cells) as it flows through the switch fabric 100. In some embodiments, for example, each cell switch includes multiple input ports operatively coupled to write interfaces on a memory buffer. Similarly, a set of output ports are operatively coupled to read interfaces on the memory buffer (not shown). In some embodiments, the memory buffer can be a shared memory buffer implemented using on-chip static random access memory (SRAM) to provide sufficient bandwidth for all input ports to write one incoming cell (e.g., a portion of a data packet) per time period (e.g., one or more clock cycles) and all output ports to read one outgoing cell per time period. Each cell switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112 of the first stage 140 includes a set of input ports 160 configured to receive data (e.g., a signal, a cell of a packet, etc.) as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module 112 of the first stage 140 by a data path 120. Each data path 120 between a given module 112 of the first stage 140 and a given module 114 of the second stage 142 is configured to facilitate data transfer from the modules 112 of the first stage 140 to the modules 114 of the second stage 142.

The data paths 120 between the modules 112 of the first stage 140 and the modules 114 of the second stage 142 can be constructed in any manner configured to facilitate data transfer from the modules 112 of the first stage 140 to the modules 114 of the second stage 142. In some embodiments, for example, the data paths 120 are optical connectors between the modules. In other embodiments, the data paths are within a midplane. Such a midplane can be similar to that described in further detail herein. Such a midplane can be used to connect each module of the second stage with each module of the first stage. In still other embodiments, two or more modules are contained within a single chip package and the data paths are electrical traces.

In some embodiments, the switch fabric 100 is a non-blocking Clos network. Thus, the number of modules 114 of the second stage 142 of the switch fabric 100 varies based on the number of input ports 160 of each module 112 of the first stage 140. In a rearrangeably non-blocking Clos network (e.g., a Benes network), the number of modules 114 of the second stage 142 is greater than or equal to the number of input ports 160 of each module 112 of the first stage 140. Thus, if n is the number of input ports 160 of each module 112 of the first stage 140 and m is the number of modules 114 of the second stage 142, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144 of the switch fabric 100 includes modules 116. The modules 116 of the third stage 144 are structurally similar to the modules 112 of the first stage 140. The number of modules 116 of the third stage 144 is typically equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is typically equivalent to the number of input ports 160 of each module 112 of the first stage 140.

Each module 116 of the third stage 144 is connected to each module 114 of the second stage 142 by a data path 124. The data paths 124 between the modules 114 of the second stage 142 and the modules 116 of the third stage 144 are configured to facilitate data transfer from the modules 114 of the second stage 142 to the modules 116 of the third stage 144.

The data paths 124 between the modules 114 of the second stage 142 and the modules 116 of the third stage 144 can be constructed in any manner configured to facilitate data transfer from the modules 114 of the second stage 142 to the modules 116 of the third stage 144. In some embodiments, for example, the data paths 124 are optical connectors between the modules. In other embodiments, the data paths are within a midplane. Such a midplane can be similar to that described in further detail herein. Such a midplane can be used to connect each module of the second stage with each module of the third stage. In still other embodiments, two or more modules are contained within a single chip package and the data paths are electrical traces.

Figure 2:
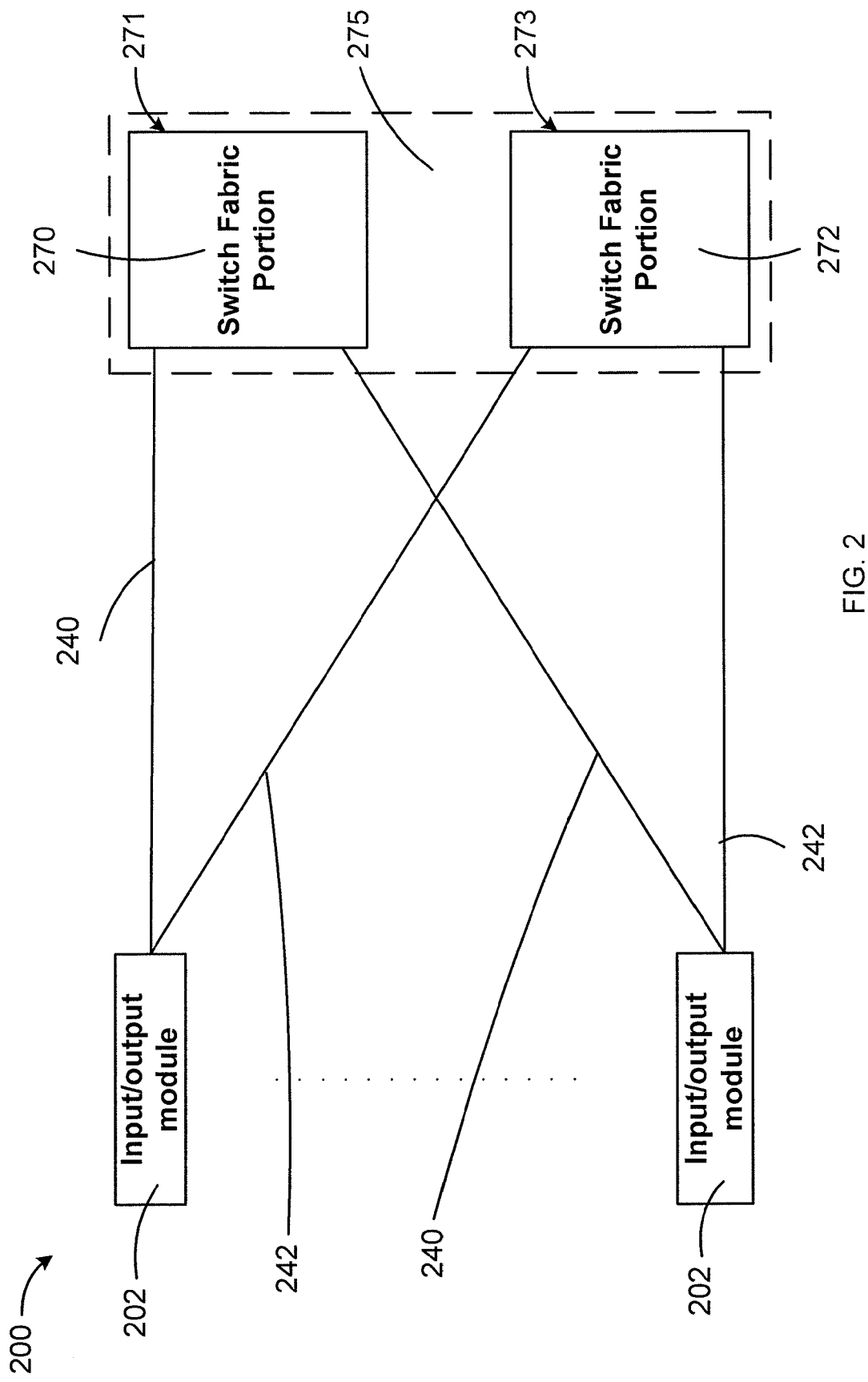
FIG. 2 is a schematic illustration of a switch fabric system, according to another embodiment.

FIG. 2 is a schematic illustration of a switch fabric system 200, according to an embodiment. Switch fabric system 200 includes multiple input/output modules 202, a first set of cables 240, a second set of cables 242, and a switch fabric 275. The switch fabric 275 includes a first switch fabric portion 271 disposed within a chassis 270 or housing, and a second switch fabric portion 273 disposed within a chassis 272 or housing.

The input/output modules 202 can be operatively coupled to peripheral devices such as, for example, servers, storage devices, workstations, and/or the like. The input/output modules 202 operatively couple the peripheral devices to the switch fabric system 200. As such, the input/output modules 202 are configured to send data (e.g., data cells) received from the first switch fabric portion 271 and/or the second switch fabric portion 273 to the peripheral devices. Similarly, the input/output modules 202 are configured to send data received from the peripheral devices to the first switch fabric portion 271 and/or the second switch fabric portion 273.

Each input/output module 202 includes a parsing function, a classifying function, a forwarding function, and a queuing-and-scheduling function. Thus, packet parsing, packet classifying, packet forwarding, and packet queuing-and-scheduling all occur prior to a data cell entering the first switch fabric portion 271 and/or the second switch fabric portion 273. Accordingly, these functions do not need to be performed at each stage of the switch fabric 275, and each module of the switch fabric portions 271, 273 (described in further detail herein) do not need to include capabilities to perform these functions. This reduces the cost, power consumption, cooling requirements and the physical area required for each module of the switch fabric portions 271, 273. This also reduces the latency associated with the switch fabric 275. In some embodiments, for example, the end-to-end latency (i.e., time it takes to send data through the switch fabric 275 from an input/output module 202 to another input/output module 202) can be lower than the end-to-end latency of a switch fabric system using an Ethernet protocol. In some embodiments, the throughput of the switch fabric portions 271, 273 is constrained only by the connection density of the switch fabric system 200 and not by power and thermal limitations. In some embodiments, the input/output modules 202 separate a data packet into multiple data cells to be sent through the switch fabric portion 271 and/or the switch fabric portion 273. The parsing function, classifying function, forwarding function, and queuing-and-scheduling function can be performed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each input/output module 202 is configured to connect to a first end of a cable of the first set of cables 240 and a first end of a cable of the second set of cables 242. Each cable 240 operatively connects an input/output module 202 and the first switch fabric portion 271. Similarly, each cable 242 operatively connects an input/output module 202 and the second switch fabric portion 273. Using the first set of cables 240 and the second set of cables 242, each input/output module 202 can send data to and/or receive data from the first switch fabric portion 271 and/or the second switch fabric portion 273, respectively.

The first set of cables 240 and the second set of cables 242 can be constructed of any material suitable to transfer data between the input/output modules 202 and the switch fabric portions 271, 273. In some embodiments, for example, each cable 240, 242 is constructed of multiple optical fibers. In such an embodiment, each cable 240, 242 can have twelve transmit and twelve receive fibers. The twelve transmit fibers of each cable 240, 242 can include eight fibers for transmitting data, one fiber for transmitting a control signal, and three fibers for expanding the data capacity and/or for redundancy. Similarly, the twelve receive fibers of each cable 240, 242 have eight fibers for receiving data, one fiber for receiving a control signal, and three fibers for expanding the data capacity and/or for redundancy. In other embodiments, any number of fibers can be contained within each cable. The transmit and receive designations of the fibers are from the perspective of the input/output modules 202. The designations are opposite if viewed from the perspective of the switch fabric portions 271, 273.

A first switch fabric portion 271 is used in conjunction with a second switch fabric portion 273 for redundancy and/or greater capacity. In other embodiments, only one switch fabric portion is used. In still other embodiments, more than two switch fabric portions are used for increased redundancy and/or greater capacity. For example, four switch fabric portions can be operatively coupled to each input/output module by, for example, four cables. The second switch fabric portion 273 is structurally and functionally similar to the first switch fabric 271 portion. Accordingly, only the first switch fabric portion 271 is described in detail herein.

Figure 3:
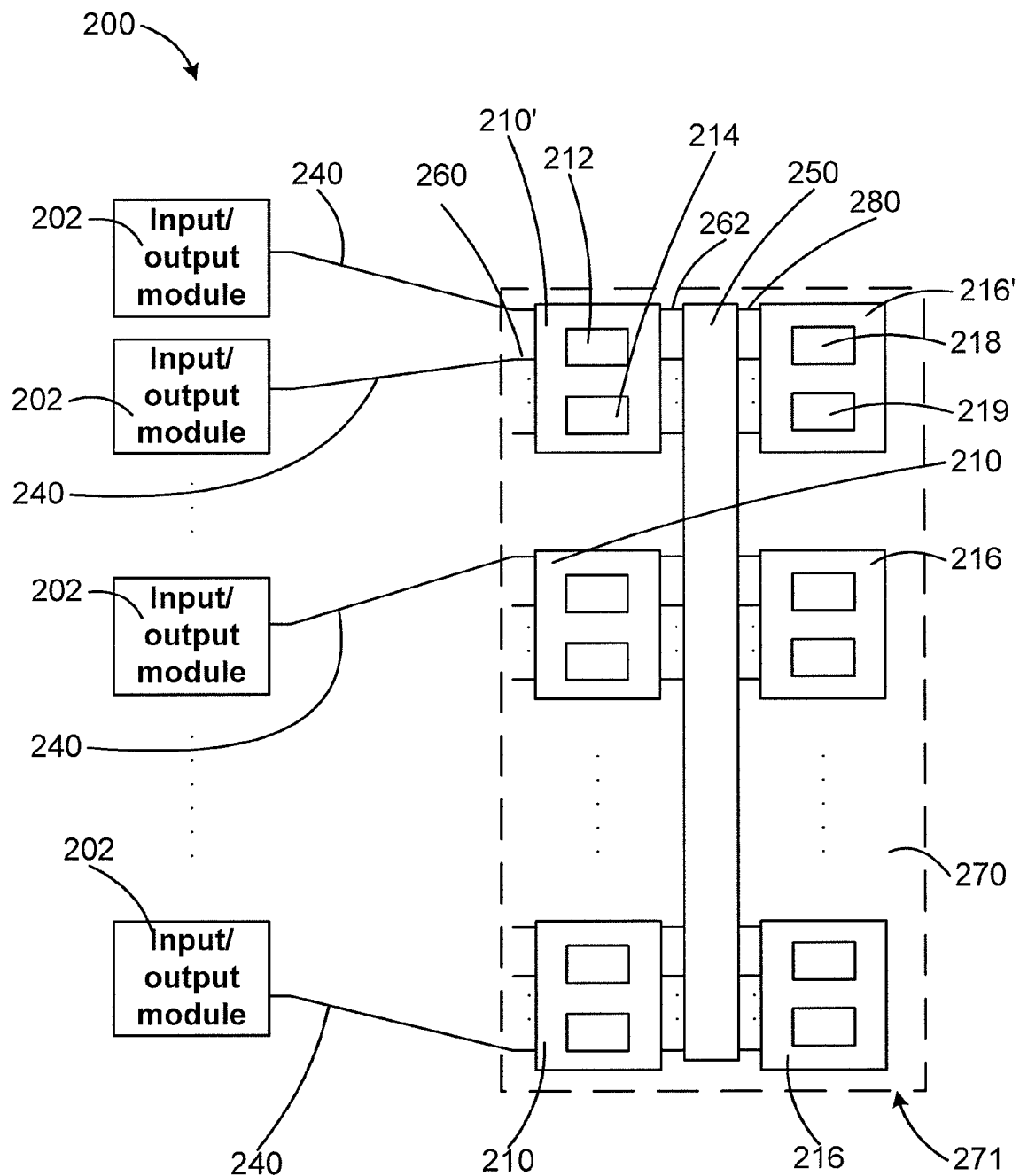
FIG. 3 is a schematic illustration of a portion of the switch fabric system of FIG. 2.

FIG. 3 shows a portion of the switch fabric system 200 of FIG. 2 including a portion of the first switch fabric portion 271 in greater detail. The first switch fabric portion 271 includes interface cards 210, which are associated with a first stage and a third stage of the first switch fabric portion 271; interface cards 216, which are associated with a second stage of the first switch fabric portion 271; and a midplane 250. In some embodiments, the first switch fabric portion 271 includes eight interface cards 210, which are associated with the first stage and the third stage of the first switch fabric portion 271, and eight interface cards 216, which are associated with the second stage of the first switch fabric portion 271. In other embodiments, a different number of interface cards associated with the first stage and the third stage of the first switch fabric portion 271 and/or a different number of interface cards associated with the second stage of the first switch fabric portion 271 can be used.

As shown in FIG. 3, each input/output module 202 is operatively coupled to an interface card 210 via one of the cables of the first set of cables 240. In some embodiments, for example, each of eight interface cards 210 is operatively coupled to sixteen input/output modules 202, as described in further detail herein. Thus, the first switch fabric portion 271 can be coupled to 128 input/output modules (16×8=128). Each of the 128 input/output modules 202 can send data to and receive data from the first switch fabric portion 271.

Each interface card 210 is connected to each interface card 216 via the midplane 250. Thus, each interface card 210 can send data to and receive data from each interface card 216, as described in further detail herein. Using a midplane 250 to connect the interface cards 210 to the interface cards 216, decreases the number of cables that would otherwise be used to connect the stages of the first switch fabric portion 271.

Figure 4:
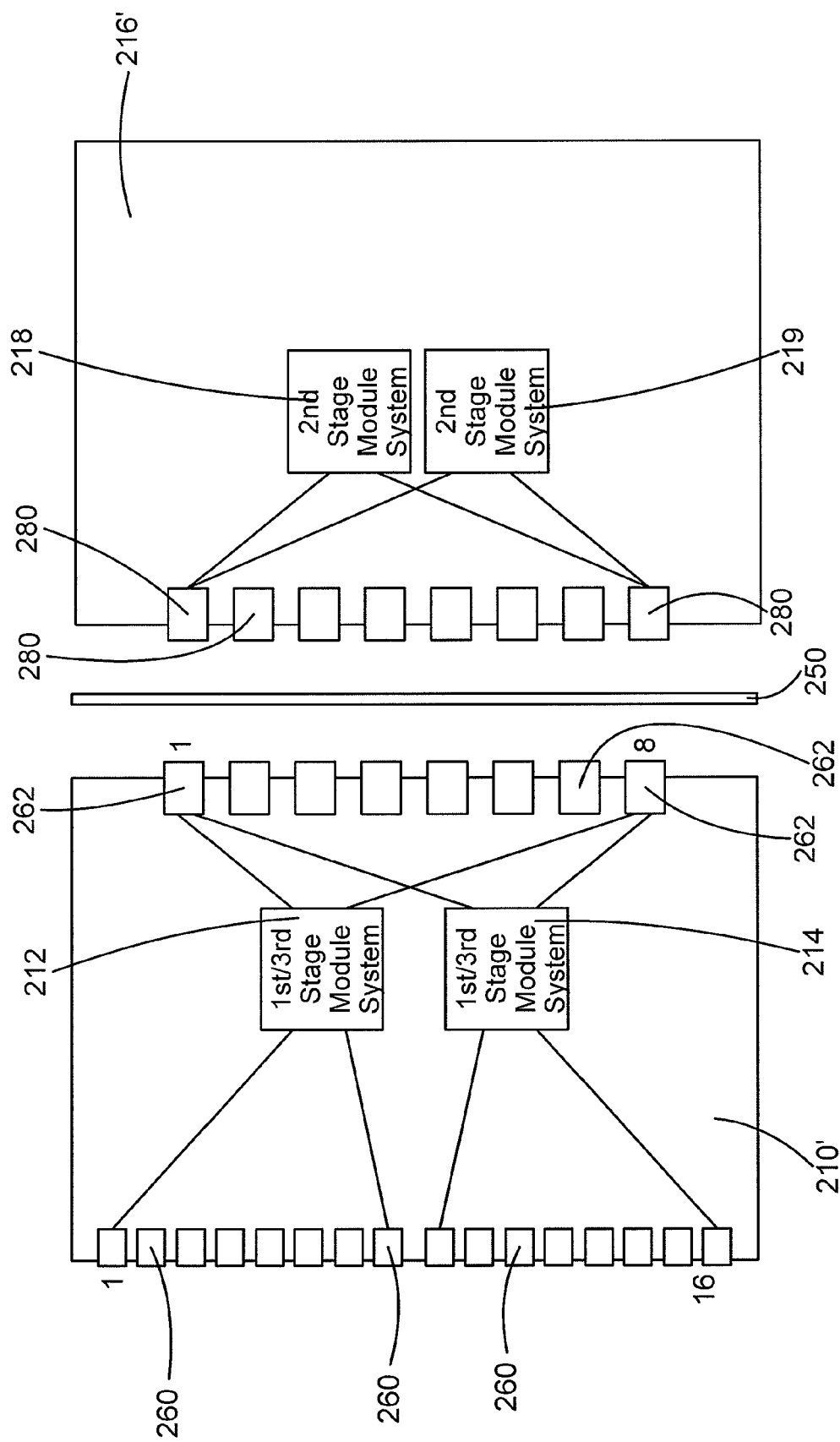
FIG. 4 is a schematic illustration of a portion of the switch fabric system of FIG. 2.

FIG. 4 shows a first interface card 210', the midplane 250, and a first interface card 216', in greater detail. Interface card 210' is associated with the first stage and the third stage of the first switch fabric portion 271, and interface card 216' is associated with the second stage of the first switch fabric portion 271. Each interface card 210 is structurally and functionally similar to the first interface card 210'. Likewise, each interface card 216 is structurally and functionally similar to the first interface card 216'.

The first interface card 210' includes multiple cable connector ports 260, multiple 1st/3rd stage module systems 212, 214, and multiple midplane connector ports 262. In other embodiments, the first interface card includes a single 1st/3rd stage module system.

FIG. 4 shows the first interface card 210' having sixteen cable connector ports 260 and eight midplane connector ports 262. Each cable connector port 260 of the first interface card 210' is configured to receive a second end of a cable from the first set of cables 240. Thus, as stated above, sixteen cable connector ports 260 on each of the eight interface cards 210 are used to receive up to 128 cables (16×8=128). While shown in FIG. 4 as having sixteen cable connector ports 260, in other embodiments, any number of cable connector ports can be used, such that each cable from the first set of cables can be received by a cable connector port in the first switch fabric portion. For example, if sixteen interface cards are used, each interface card can include eight cable connector ports.

The 1st/3rd stage module systems 212, 214 of the first interface card 210' each includes a module associated with the first stage of the first switch fabric portion 271 and a module associated with the third stage of the first switch fabric portion 271. In some embodiments, eight cable connector ports of the sixteen cable connector ports 260 are operatively coupled to the 1st/3rd stage module system 212 and the remaining eight cable connector ports of the sixteen cable connector ports 260 are operatively coupled to the 1st/3rd stage module system 214. Both of the 1st/3rd stage module systems 212, 214 are operatively coupled to each of the eight midplane connector ports 262 of interface card 210'.

The 1st/3rd stage module systems 212, 214 of the first interface card 210' can be application-specific integrated circuits (ASICs) or chip packages having multiple ASICs. The 1st/3rd stage module systems 212, 214 can be instances of the same ASIC or chip package. Said another way, the ASIC or chip package of each 1st/3rd stage module system 212, 214 can be substantially similar (i.e., the same kind or type) to the ASIC or chip package of other 1st/3rd stage module systems 212, 214. Thus, manufacturing costs can be decreased because multiple instances of a single ASIC or chip package can be produced. Further, a module associated with the first stage of the first switch fabric portion 271 and a module associated with the third stage of the first switch fabric portion 271 are included on each ASIC and/or each chip package.

In some embodiments, each midplane connector port of the eight midplane connector ports 262 has twice the data capacity of each cable connector port of the sixteen cable connector ports 260. Thus, instead of having eight data transmit and eight data receive connections, the eight midplane connector ports 262 each has sixteen data transmit and sixteen data receive connections. Thus, the bandwidth of the eight midplane connector ports 262 can be substantially equivalent to the bandwidth of the sixteen cable connector ports 260. In other embodiments, each midplane connector port has thirty-two data transmit and thirty-two data receive connections. In such an embodiment, each cable connector port has sixteen data transmit and sixteen data receive connections. In other embodiments, any number of ports and connections are possible.

The eight midplane connector ports 262 of the first interface card 210' are connected to the midplane 250. The midplane 250 is configured to connect each interface card 210, which is associated with the first stage and the third stage of the first switch fabric portion 271, to each interface card 216, which is associated with the second stage of the first switch fabric portion 271. Thus, the midplane 250 ensures that each midplane connector port 262 of each interface card 210 is connected to a midplane connector port 280 of a different interface card 216. Said another way, no two midplane connector ports of the same interface card 210 are operatively coupled to the same interface card 216. Thus, the midplane 250 allows each interface card 210 to send data to and receive data from any of the eight interface cards 216. In other embodiments, other arrangements are possible. For example, an interface card can have at least two midplane connector ports operatively coupled to another interface card.

While FIG. 4 shows a schematic view of the first interface card 210', the midplane 250, and the first interface card 216', in some embodiments, the interface cards 210, the midplane 250, and the interface cards 216 are physically positioned similar to the horizontally-positioned interface cards 320, the midplane 340, and vertically-positioned interface cards 330, respectively, shown in FIGS. 5-7 and described in further detail below. Thus, the modules associated with the first stage and the modules associated with the third stage (both on the interface cards 210) are coupled on one side of the midplane 250, and the modules associated with the second stage (on the interface cards 216) are coupled on the opposite side of the midplane 250. This topology allows each module associated with the first stage to be operatively coupled to each module associated with the second stage, and each module associated with the second stage to be operatively coupled to each module associated with the third stage.

The first interface card 216' includes multiple midplane connector ports 280 and multiple 2nd stage module systems 218, 219. In other embodiments, the first interface card includes a single 2nd stage module system. The multiple midplane connector ports 280 are configured to send data to and receive data from any of the interface cards 210, via the midplane 250. In some embodiments, the first interface card 216' includes eight midplane connector ports 280.

The 2nd stage module systems 218, 219 of the first interface card 216' each include at least one module associated with the second stage and are operatively coupled to each midplane connector port 280 of the first interface card 216'. Thus, through the midplane 250, each of the 1st/3rd stage module systems 212, 214 of the first switch fabric portion 271 is operatively coupled to each of the 2nd stage module systems 218, 219 of the first switch fabric portion 271. Said another way, each module system 212, 214 associated with the first stage and the third stage of the first switch fabric portion 271 can send data to and receive data from any of the module systems 218, 219 associated with the second stage of the first switch fabric portion 271, and vice versa. Specifically, a module associated with the first stage within a module system 212 or 214 can send data and/or control signals to a module associated with the second stage within a module system 218 or 219. Similarly, the module associated with the second stage within the module system 218 or 219 can send data and/or control signals to a module associated with the third stage within a module system 212 or 214. In other embodiments, the module associated with the third stage can send data and/or control signals to the module associated with the second stage, and the module associated with the second stage can send data and/or control signals to the module associated with the first stage.

In embodiments where each module associated with the first stage of the first switch fabric portion 271 has eight inputs (i.e., two modules per each interface card 210), the second stage of the first switch fabric portion 271 can have at least eight modules for the first switch fabric portion 271 to remain rearrangeably non-blocking. Thus, the second stage of the first switch fabric portion 271 has at least eight modules and is rearrangeably non-blocking. In some embodiments, twice the number of modules associated with the second stage are used to facilitate expansion of the switch fabric system 200 from a three-stage switch fabric to a five-stage switch fabric, as described in further detail herein. For example, in some embodiments, sixteen modules associated with the second stage can be used to facilitate future expansion of the switch fabric system 200 from a three-stage switch fabric to a five-stage switch fabric. In other embodiments, the switch fabric can be expanded to have more than five stages.

The 2nd stage module systems 218, 219 of first interface card 216' are application-specific integrated circuits (ASICs) or chip packages having multiple ASICs. The 2nd stage module systems 218, 219 are instances of the same ASIC or chip package. Said another way, the ASIC or chip package of the 2nd stage module system 218 is substantially similar to (i.e., the same kind of type) the ASIC or chip package of the 2nd stage module system 219. Additionally, in some embodiments, the 2nd stage module systems 218, 219, are instances of the ASIC or chip package also used for the 1st/3rd stage module systems 212, 214 of the first interface card 210'. Thus, manufacturing costs can be decreased because multiple instances of a single ASIC or chip package can be used for each of the module systems in the first switch fabric portion 271.

In use, data is transferred from a first input/output module 202 to a second input/output module 202 via the first switch fabric portion 271. The first input/output module 202 sends data into the first switch fabric portion 271 via a cable of the first set of cables 240. The data passes through a cable connector port 260 of one of the interface cards 210' and into a module associated with the first stage within a module system 212 or 214.

The module associated with the first stage within the module system 212 or 214 forwards the data to a module associated with the second stage within a module system 218 or 219, by sending the data through one of the midplane connector ports 262 of the interface card 210', through the midplane 250, and to one of the interface cards 216'. The data enters the interface card 216' through a midplane connector port 280 of the interface card 216'. The data is then sent to the module associated with the second stage within a module system 218 or 219.

The module associated with the second stage determines how to send the data using, for example, a routing table and redirects the data back to the interface card 210', via the midplane 250. Because each module system 218 or 219 is operatively coupled to each module system 212 and 214 on interface card 210', the module associated with the second stage within the module system 218 or 219 can use a routing table to ensure that the data is sent to a module associated with the third stage within the module system 212 or 214 that is operatively coupled to the second input/output module.

The data is sent to the module associated with the third stage within a module system 212, 214 on the interface card 210'. The module associated with the third stage then sends the data to the second input/output module of the input/output modules 202 via a cable of the first set of cables 240 through a cable connector port 260.

In some embodiments, the first input/output module 202 separates the data into separate portions (e.g., cells) and the module associated with the first stage forwards a portion of the data to various modules associated with the second stage to which the module associated with the first stage is operatively coupled (e.g., in this embodiment, each module associated with the second stage can receive a portion of the data). Each module associated with the second stage then determines how to send the portions of the data using, for example, a routing table and redirects the portions of the data back to a single module associated with the third stage. The received portions of the data are sent to the second input/output module 202. The second input/output module 202 can then reconstruct the data from the received portions.

Figure 6:
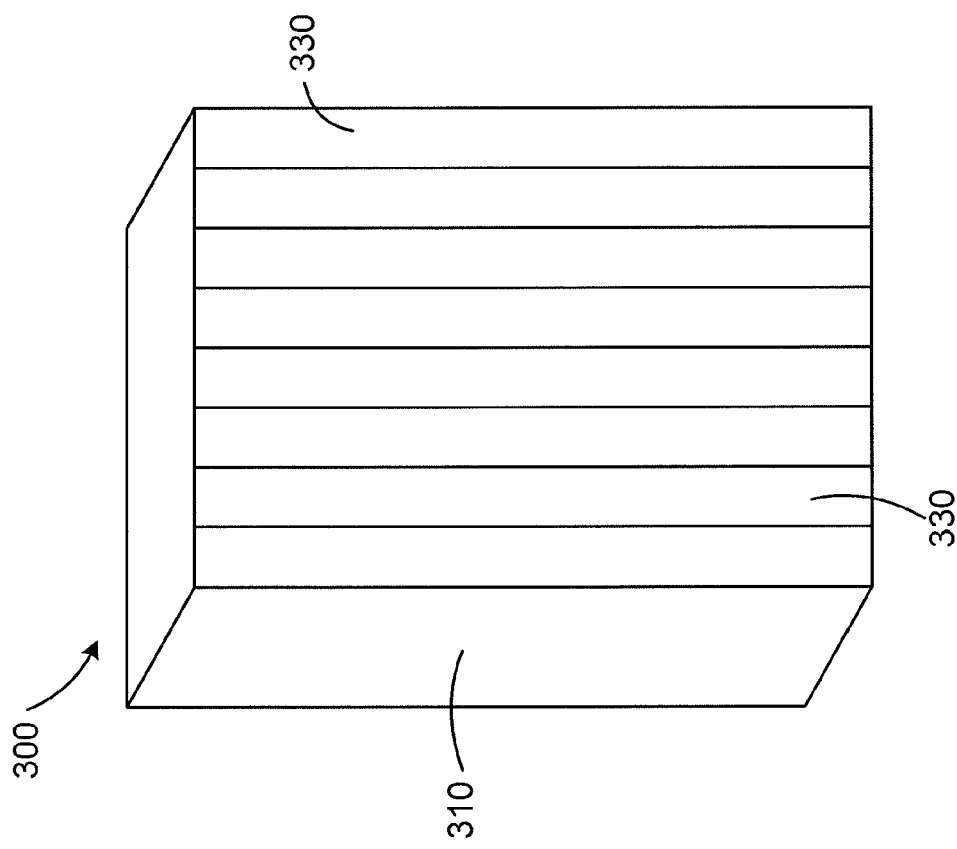
FIGS. 5 and 6 show front and back perspective views respectively, of a chassis used to house a switch fabric, according to another embodiment.
Figure 5:
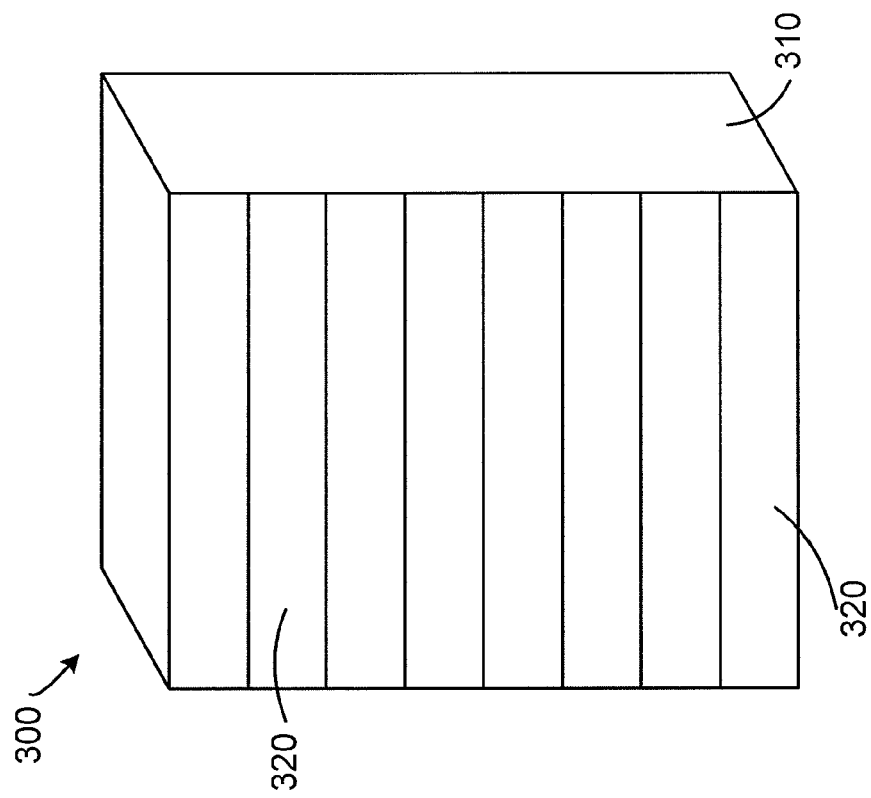
Figure 7:
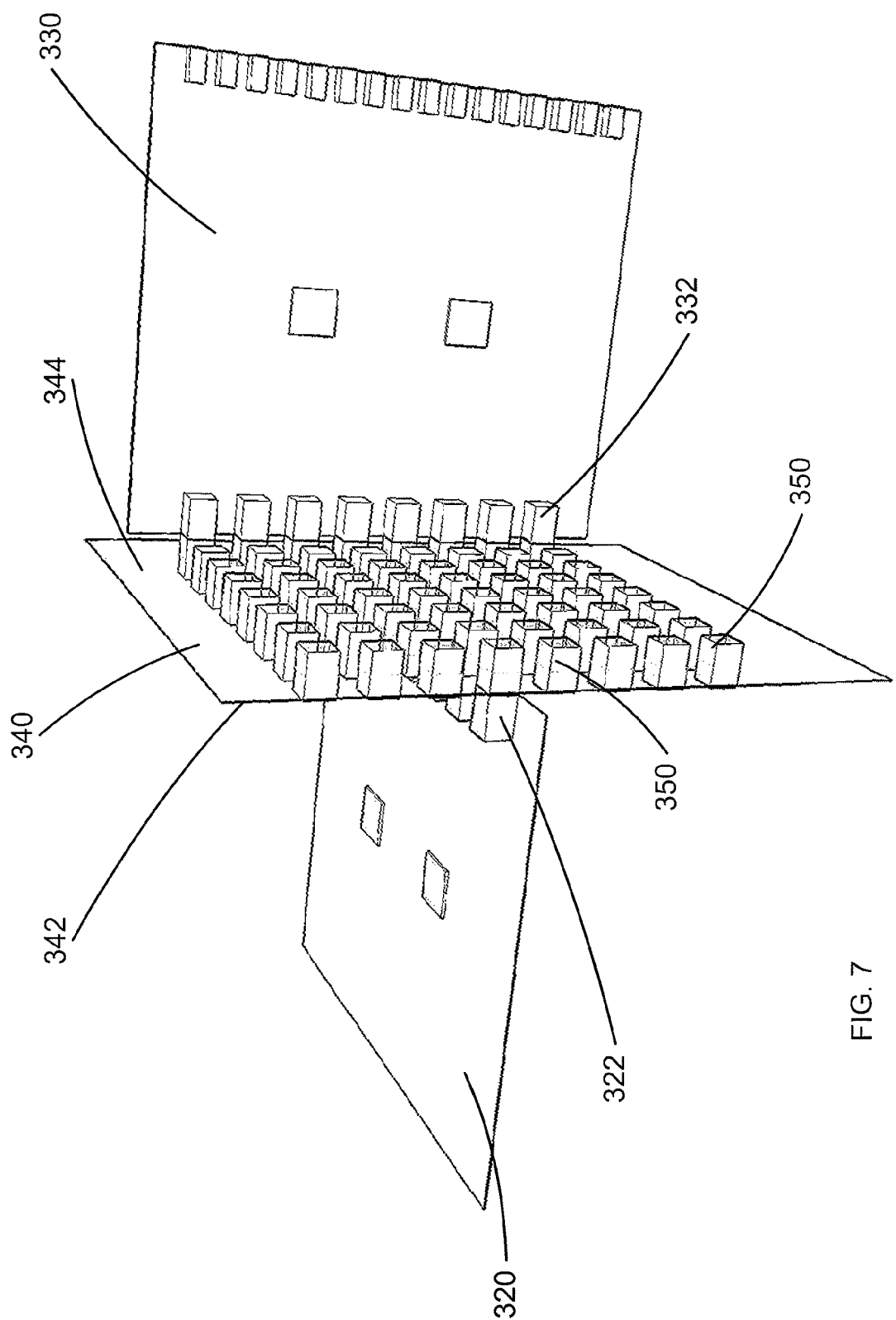
FIG. 7 shows a portion of the chassis of FIGS. 5 and 6.

FIGS. 5-7 show a chassis 300 (i.e., a housing) used to house at least a portion of a switch fabric (such as first switch fabric portion 271 described above), according to an embodiment. The chassis 300 includes a casing 310, a midplane 340, horizontally-positioned interface cards 320 and vertically-positioned interface cards 330. FIG. 5 shows a front view of the casing 310 in which eight horizontally-positioned interface cards 320 can be seen disposed within the casing 310. FIG. 6 shows a rear view of the casing 310 in which eight vertically-positioned interface cards 330 can be seen disposed within the casing 310.

Each horizontally-positioned interface card 320 is operatively coupled to each vertically-positioned interface card 330 by the midplane 340 (see FIG. 7). The midplane 340 includes a front surface 342, a rear surface 344 and an array of receptacles 350 that connect the front surface 342 with the rear surface 344, as described below. As shown in FIG. 7, the horizontally-positioned interface cards 320 include multiple midplane connector ports 322 that connect to the receptacles 350 on the front surface 342 of the midplane 340. Similarly, the vertically-positioned interface cards 330 include multiple midplane connector ports 332 that connect to the receptacles 350 on the rear surface 344 of the midplane 340. In this manner, a plane defined by each horizontally-positioned interface card 320 intersects a plane defined by each vertically-positioned interface card 330.

The receptacles 350 of the midplane 340 operatively couple each horizontally-positioned interface card 320 to each vertically-positioned interface card 330. The receptacles 350 facilitate the transfer of signals between a horizontally-positioned interface card 320 and a vertically-positioned interface card 330. In some embodiments, for example, the receptacles 350 can be multiple-pin connectors configured to receive multiple pin-connectors disposed on the midplane connector ports 322, 332 of the interface cards 320, 330, hollow tubes that allow a horizontally-positioned interface card 320 to directly connect with a vertically-positioned interface card 330, and/or any other device configured to operatively couple two interface cards. Using such a midplane 340, each horizontally-positioned interface card 320 is operatively coupled to each vertically-positioned interface card 330 without routing connections (e.g., electrical traces) on the midplane.

FIG. 7 shows a midplane including a total of 64 receptacles 350 positioned in an 8×8 array. In such an embodiment, eight horizontally-positioned interface cards 320 can be operatively coupled to eight vertically-positioned interface cards 330. In other embodiments, any number of receptacles can be included on the midplane and/or any number of horizontally-positioned interface cards can be operatively coupled to any number of vertically-positioned interface cards through the midplane.

When the first switch fabric portion 271 is housed in chassis 300, for example, each interface card 210 associated with the first stage and the third stage of the first switch fabric portion 271 is positioned horizontally and each interface card 216 associated with the second stage of the first switch fabric portion 271 is positioned vertically. Thus, each interface card 210 associated with the first stage and the third stage of the first switch fabric portion 271 is easily connected to each interface card 216 associated with the second stage of the first switch fabric portion 271, through the midplane 340. In other embodiments, each interface card associated with the first stage and the third stage of the first switch fabric portion is positioned vertically and each interface card associated with the second stage of the first switch fabric portion is positioned horizontally. In still other embodiments, each interface card associated with the first stage and the third stage of the first switch fabric portion can be positioned at any angle with respect to the chassis and each interface card associated with the second stage of the first switch fabric portion can be positioned at an angle substantially orthogonal to the angle of the interface card associated with the first stage and the third stage of the first switch fabric portion with respect to the chassis. In other embodiments, each interface card associated with the second stage of the first switch fabric portion can be positioned at an angle that is not substantially orthogonal to the angle of the interface card associated with the first stage and the third stage of the first switch fabric portion with respect to the chassis.

Figure 8:
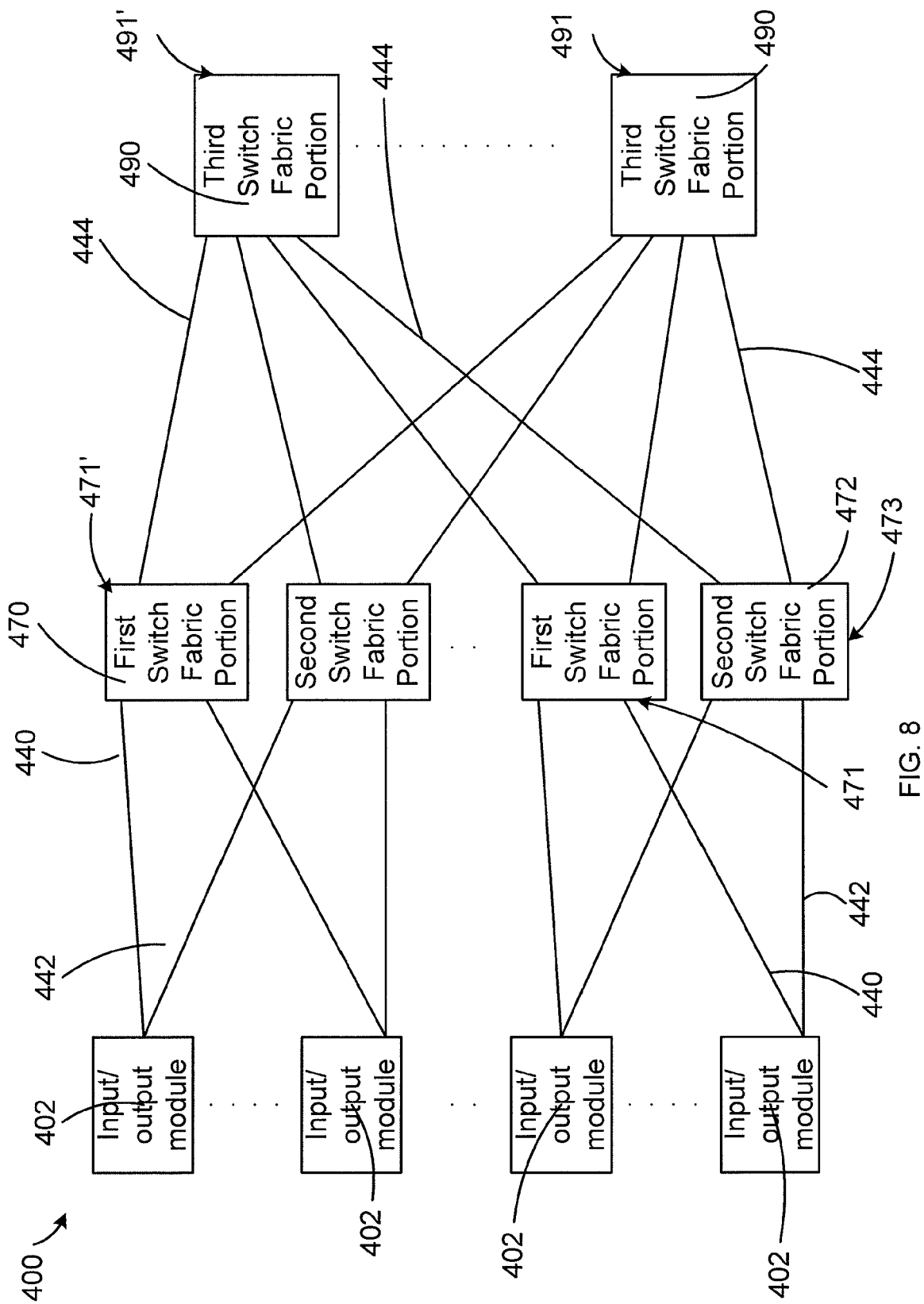
FIG. 8 is a schematic illustration of a switch fabric system, according to another embodiment.

While FIGS. 1-4 show three-stage switch fabric systems 100 and 200, such a switch fabric system can be expanded to include five-stages. For example, FIG. 8 shows a schematic illustration of a switch fabric system 400, according to an embodiment. The method used to expand a three-stage switch fabric system (e.g., switch fabric system 200) to a five-stage switch fabric system (e.g., switch fabric system 400) is shown and described in further detail herein.

The switch fabric system 400 includes multiple input/output modules 402, a first set of cables 440, a second set of cables 442, multiple first switch fabric portions 471 each disposed within a separate chassis 470, and multiple second switch fabric portions 473 each disposed within a separate chassis 472. The input/output modules 402, the first set of cables 440, and the second set of cables 442 are structurally and functionally similar to the input/output modules 202, the first set of cables 240, and the second set of cables 242, respectively.

The switch fabric system 400 further includes a third set of cables 444 and multiple third switch fabric portions 491, each disposed within a separate chassis 490 (i.e., a housing). The chassis 490 can be similar to the chassis 300 described in detail above. Each first switch fabric portion 471 and each second switch fabric portion 473 is operatively coupled to each third switch fabric portion 491 via the third set of cables 444. Thus, each first switch fabric portion 471 and each second switch fabric portion 473 is operatively coupled to the other first switch fabric portions 471 and the other second switch fabric portions 473 via the third switch fabric portions 491. Accordingly, the switch fabric system 400 operates as a five-stage network.

The third set of cables 444 can be constructed of any material suitable to transfer data (e.g., data cells) between the first switch fabric portions 471 and the third switch fabric portions 491, and the second switch fabric portions 473 and the third switch fabric portions 491. In some embodiments, for example, each cable 444 is constructed of multiple optical fibers. In such an embodiment, each cable 444 can have thirty-six transmit and thirty-six receive fibers. The thirty-six transmit fibers of each cable 444 can include thirty-two fibers for transmitting data, and four fibers for expanding the data capacity, sending control signals and/or redundancy. Similarly, the thirty-six receive fibers of each cable 444 have thirty-two fibers for transmitting data, and four fibers for expanding the data capacity, sending control signals and/or redundancy. In other embodiments, any number of fibers can be contained within each cable. By using cables having an increased number of optical fibers, the number of cables used can be significantly reduced.

Figure 9:
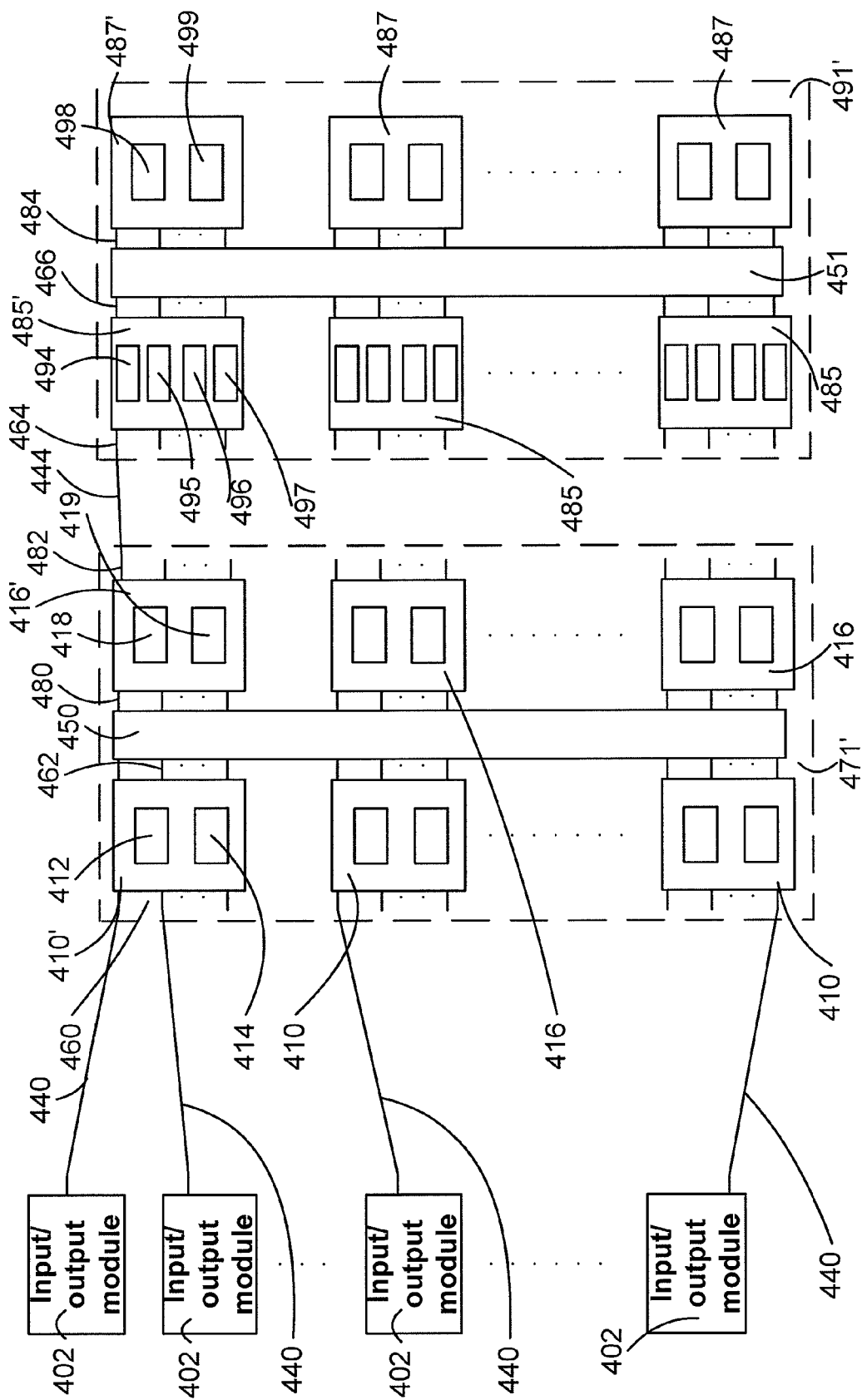
FIG. 9 is a schematic illustration of a portion of the switch fabric system of FIG. 8.

FIG. 9 shows a segment of a switch fabric portion 471' and a segment of a third switch fabric portion 491'. Each switch fabric portion 471 is structurally and functionally similar to the switch fabric portion 471', and each third switch fabric portion 491 is structurally and functionally similar to the third switch fabric portion 491'.

Figure 10:
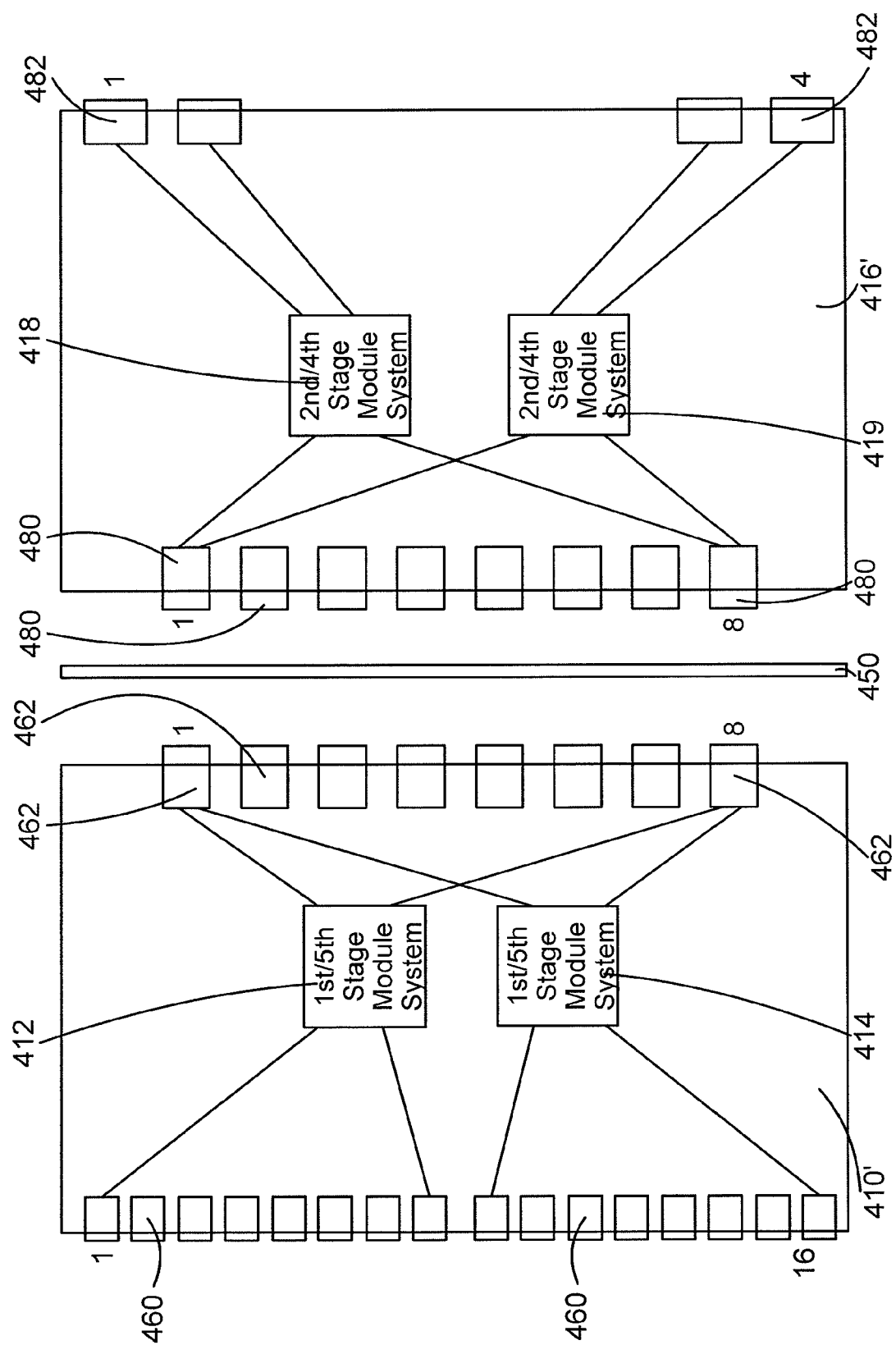
FIG. 10 is a schematic illustration of a portion of the switch fabric system of FIG. 8.

The switch fabric portion 471' includes multiple interface cards 410 associated with a first stage and a fifth stage of the switch fabric system 400 (a portion which is shown in FIG. 10), multiple interface cards 416 associated with a second stage and a fourth stage of the switch fabric system 400 (a portion which is shown in FIG. 10), and a midplane 450 configured to operatively couple the interface cards 410 to the interface cards 416. In some embodiments, the switch fabric portion 471' includes eight interface cards 410 and eight interface cards 416. In other embodiments, the switch fabric portion 471' includes a different number of interface cards 410 and/or interface cards 416.

FIG. 10 shows an interface card 410' associated with the first stage and the fifth stage of the switch fabric system 400, the midplane 450, and an interface card 416' associated with the second stage and the fourth stage of the switch fabric system 400, in greater detail. The interface card 410' includes multiple cable connector ports 460, a first 1st/5th stage module system 412, a second 1st/5th stage module system 414, and multiple midplane connector ports 462. Each cable connector port 460 of interface card 410' is configured to receive a second end of a cable from the first set of cables 440. In some embodiments, for example, the interface card 410' includes sixteen cable connector ports 460. Thus, in such an embodiment, sixteen cable connector ports 460 on each of the eight interface cards 410 are used to receive the 128 cables (16×8=128). While shown in FIG. 10 as having sixteen cable connector ports 460, in other embodiments, any number of cable connector ports can be used, such that each cable of the first set of cables can be received by a cable connector port in the first switch fabric. For example, if sixteen interface cards are used, each interface card needs to include eight cable connector ports.

The first module system 412 and the second module system 414 of the interface card 410' each includes a module of the first stage and a module of the fifth stage of the switch fabric switch fabric system 400. In some embodiments, eight cable connector ports of the sixteen cable connector ports 460 are operatively coupled to the first module system 412 and the remaining eight cable connector ports of the sixteen cable connector ports 460 are operatively coupled to the second module system 414. Both the first module system 412 and the second module system 414 are operatively coupled to each of the midplane connector ports 462 of the interface card 410'.

The first module system 412 and the second module system 414 of the interface card 410' are application-specific integrated circuits (ASICs). The first module system 412 and the second module system 414 are instances of the same ASIC. Thus, manufacturing costs can be decreased because multiple instances of a single ASIC can be produced. Further, a module of the first stage and a module of the fifth stage are both included on each ASIC.

In some embodiments, each midplane connector port 462 has twice the capacity of each cable connector port 460. For example, in some embodiments, the interface card 410 has sixteen cable connector ports 460 and eight midplane connector ports 462. Each cable connector port 460 can receive eight data transmit connections, eight data receive connections, and eight control and/or parity connections. Thus, the sixteen cable connector ports 460 of the interface card 410 collectively include a total of 128 data transmit connections and 128 data receive connections. In such embodiments, each of the eight midplane connector ports 462 within the interface card 410 can contain sixteen data transmit connections and sixteen data receive connections. Thus, the eight midplane connector ports 462 of the interface card 410 collectively include a total of 128 data transmit connections and 128 data receive connections. Accordingly, in such an embodiment, the total bandwidth of the eight midplane connector ports 462 is equivalent to the total bandwidth of the sixteen cable connector ports 460.

In other embodiments, the total bandwidth of the midplane connector ports can be twice the total bandwidth of the cable connector ports. In such embodiments, each midplane connector port can have, for example, thirty-two data transmit connections and thirty-two data receive connections. Thus, the eight midplane connector ports of the interface card collectively include a total of 256 data transmit connections and 256 data receive connections. Accordingly, the midplane connector ports of the interface card can support twice the bandwidth of the cable connector ports. In such embodiments, substantially similar midplanes can be used for both the first switch fabric portions 471, the second switch fabric portions 473 and the third switch fabric portions 491.

The eight midplane connector ports 462 of the interface card 410' are connected to the midplane 450. The midplane 450 is configured to connect each interface card 410 to each interface card 416. Thus, the midplane 450 ensures that each midplane connector port 462 of each interface card 410 is operatively coupled to a midplane connector port 480 of a different interface card 416 via the midplane 450. Said another way, no two midplane connector ports of the same interface card 410 are operatively coupled to the same interface card 416. Thus, the midplane 450 allows each interface card 410 to send data to and receive data from any of the interface cards 416.

The interface card 416' includes multiple midplane connector ports 480, a first 2nd/4th stage module system 418, a second 2nd/4th stage module system 419, and multiple cable connector ports 482. The midplane connector ports 480 are configured to send data to and receive data from any of the interface cards 410 associated with the first stage and the fifth stage of the switch fabric switch fabric system 400, via the midplane 450. In some embodiments, the interface card 416' includes eight midplane connector ports 480 and four cable connector ports 482.

The first module system 418 and the second module system 419 of the interface card 416' are operatively coupled to each midplane connector port 480. Thus, through the midplane 450, each module system 412, 414 associated with the first stage and the fifth stage of the switch fabric system 400 is operatively coupled to each module system 418, 419 associated with the second stage and the fourth stage of the switch fabric system 400. Said another way, each module system 412, 414 can send data to and receive data from any module system 418, 419, and vice versa.

The cable connector ports 482 of the interface card 416' associated with the second stage and the fourth stage of the switch fabric system 400 are configured to be coupled to the third set of cables 444. This enables the interface card 416' to send data to and/or receive data from the third switch fabric portions 491.

Each cable connector port 482 of the switch fabric portion 471' (as shown in FIG. 8) is operatively coupled to a different third switch fabric portion 491. In other embodiments, multiple cable connector ports of the switch fabric portion can be operatively coupled to the same third switch fabric portion. In such embodiments, each third switch fabric portion can be connected to the same number of cable connector ports. Thus, the connections between the cable connector ports of the switch fabric portion are evenly distributed across the cable connector ports of the third switch fabric portions.

In some embodiments, for example, the switch fabric system 400 includes 32 third switch fabric portions 491. If such an embodiment includes eight interface cards 410 and eight interface cards 416 in the switch fabric portion 471', the first module system 412 and the second module system 414 of the interface card 410' associated with the first stage and the fifth stage of the three-stage system 400, respectively, are both operatively coupled to each third switch fabric portion 491 via the midplane 450, the module systems 418, 419 associated with the second stage and the fourth stage, respectively, and the third set of cables 444.

The first module system 418 and the second module system 419 of interface card 416' are application-specific integrated circuits (ASICs). A module of the second stage and a module of the fourth stage are both included on each ASIC. The first module system 418 and the second module system 419 are instances of the same ASIC. Additionally, in some embodiments, the first module system 418 and the second module system 419 are instances of the ASIC used for the first module system 412 and the second module system 414 of interface card 410'. Thus, manufacturing costs can be decreased because multiple instances of a single ASIC can be used for each of the module systems in the switch fabric portion 471'.

Each third switch fabric portion 491 includes interface cards 485 associated with a retiming stage of the switch fabric system 400, interface cards 487 associated with a third stage of the switch fabric system 400, and a midplane 451 connecting the interface cards 485 to the interface cards 487. In some embodiments, the third switch fabric portion 491 includes eight interface cards 485 and eight interface cards 487. In other embodiments, any number of interface cards associated with the various stages of the switch fabric system can be used.

Figure 11:
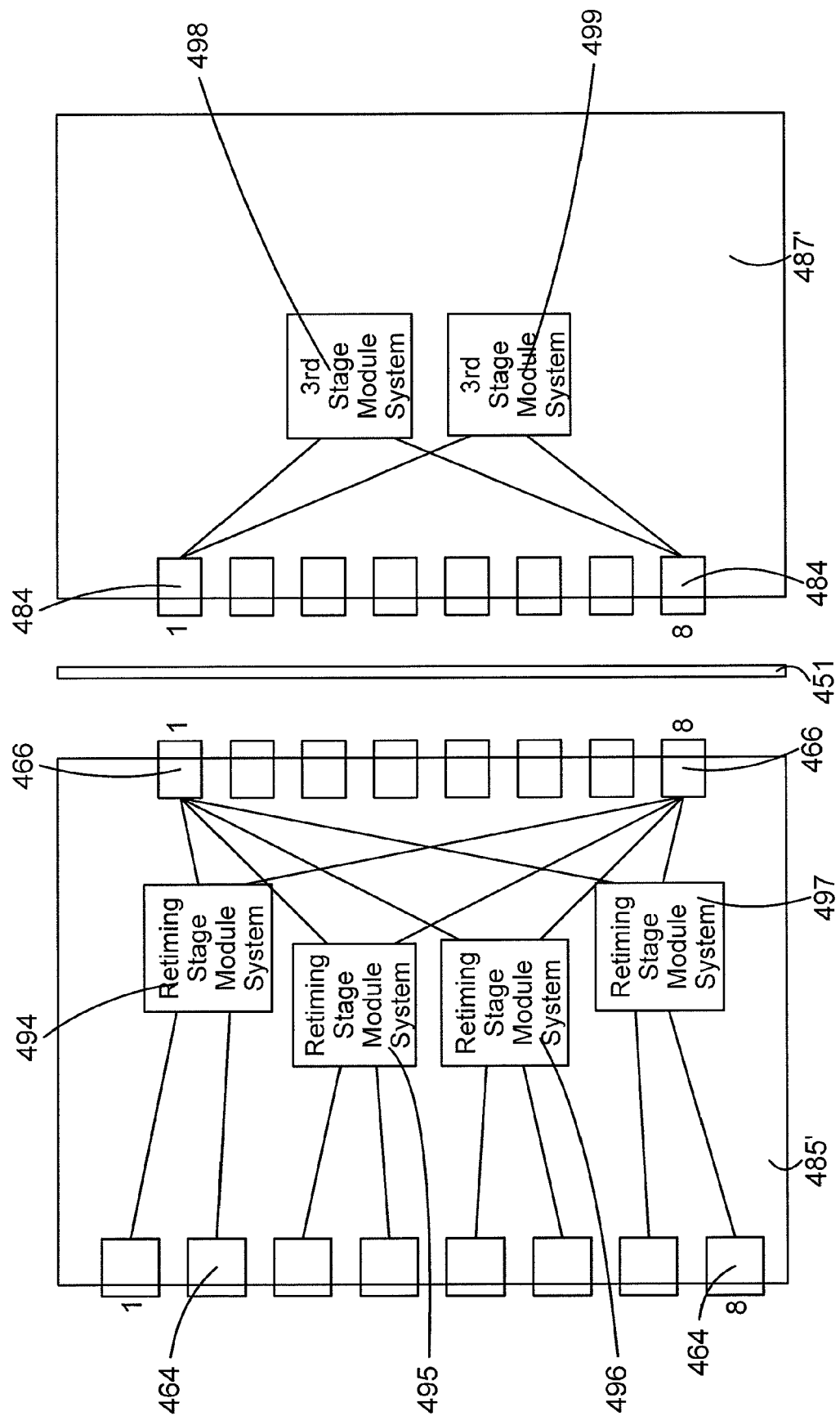
FIG. 11 is a schematic illustration of a portion of the switch fabric system of FIG. 8.

FIG. 11 shows a portion of a third switch fabric portion 491' in greater detail. Specifically, FIG. 11 shows an interface card 485' associated with the retiming stage of the switch fabric system 400, an interface card 487' associated with a third stage of the switch fabric system 400, and a midplane 451 configured to operatively couple each interface card 485 with each interface card 487 within a given third switch fabric portion 491'.

The interface card 485' includes multiple cable connector ports 464, a first retiming stage module system 494, a second retiming stage module system 495, a third retiming stage module system 496, a fourth retiming stage module system 497, and multiple midplane connector ports 466. Each cable connector port 464 of interface card 485' is configured to receive a second end of a cable of the third set of cables 444. In some embodiments, as stated above, eight cable connector ports 464 on each of the eight interface cards 485 are used to receive 64 cables 444 from the cable connector ports 482 of the interface cards 416. While shown in FIG. 11 as having eight cable connector ports 464, in other embodiments, any number of cable connector ports can be used, such that each cable of the third set of cables can be received by a cable connector port associated with an interface card associated with the retiming stage of the switch fabric system. For example, if sixteen interface cards are used, each interface card needs to include four cable connector ports.

The first module system 494, the second module system 495, the third module system 496, and the fourth module system 497 of the interface card 485' associated with the retiming stage of the system 400 each include at least one retiming stage module of the switch fabric system 400. In some embodiments, a separate pair of cable connector ports are operatively coupled to one of the module systems 494, 495, 496, 497. Each of the module systems 494, 495, 496, 497 are operatively coupled to each of the midplane connector ports 466 of interface card 485'. The retiming stage of the switch fabric system 400 is configured to retime and/or multiplex signals.

The module systems 494, 495, 496, 497 of the interface card 485' are application-specific integrated circuits (ASICs). The module systems 494, 495, 496, 497 are instances of the same ASIC. Thus, manufacturing costs can be decreased because multiple instances of a single ASIC can be produced.

In some embodiments, each midplane connector port 466 has equal data capacity of each cable connector port 464. In such an embodiment, the interface card 485' has eight cable connector ports 464 each having 72 connections. In such an embodiment, the 72 connections can include 32 data transmit connections, 32 data receive connections and 8 control and/or parity connections. Each midplane connector port 466 can similarly contain 32 data transmit connections and 32 data receive connections. In some embodiments, each midplane connector port can include control and/or parity connections. Thus, in some embodiments, the bandwidth of the midplane connector ports 466 is equivalent to the bandwidth of the cable connector ports 464. In other embodiments, the total bandwidth of the midplane connector ports is higher than the total bandwidth of the cable connector ports.

The midplane 451 is configured to connect each interface card 485 to each interface card 487, which is associated with the third stage of the switch fabric system 400. Thus, the midplane 451 ensures that each midplane connector port 466 of the interface card 485' is connected to a midplane connector port 484 of a different interface card 487 associated with the third stage of the switch fabric system 400. Said another way, no two midplane connector ports 484 of the interface card 485' are operatively coupled to the same interface card 487 associated with the third stage of the switch fabric system 400. Thus, the midplane 451 allows each interface card 485 to send data to and receive data from any of the interface cards 487.

The interface card 487' includes multiple midplane connector ports 484, a first 3rd stage module system 498, and a second 3rd stage module system 499. The multiple midplane connector ports 484 are configured to send data to and receive data from any of the interface cards 485 associated with the retiming stage of the switch fabric system 400, via the midplane 451.

The first module system 498 and the second module system 499 of the interface card 487' are operatively coupled to each midplane connector port 484 of the interface card 487'. Thus, through the midplane 451, each module system 494, 495, 496, 497 associated with the retiming stage of the switch fabric system 400 is operatively coupled to each module system 498, 499 associated with the third stage of the switch fabric system 400. Said another way, each module system 494, 495, 496, 497 can send data to and receive data from any of the module systems 498, 499, and vice versa. Additionally, each module system 498, 499 includes at least one module associated with the third stage of the switch fabric system 400.

The first module system 498 and the second module system 499 of interface card 487' are application-specific integrated circuits (ASICs). The first module system 498 and the second module system 499 are instances of the same ASIC. Additionally, in some embodiments, the first module system 498 and the second module system 499 are instances of the ASIC used for the other module systems (e.g., 1st/5th stage module systems 412, 414, 2nd/4th stage module systems 418, 419, and/or retiming stage module systems 494, 495, 496, 497) in the switch fabric system 400. Thus, manufacturing costs are decreased because multiple instances of a single ASIC can be used for each of the module systems in the switch fabric system 400.

By using cables having an increased number of data connections (e.g., optical fibers) and/or midplanes to operatively couple the modules of the various stages, the number of cables used can be significantly reduced. For example, in an embodiment that is rearrangeably non-blocking (i.e., each stage has the same number of modules) and has 4096 input/output modules, if a cable including eight data connections is used to connect each of the modules of a five-stage switch fabric (i.e., input to first stage, first stage to second stage, etc.), 24,576 cables are needed. Alternatively, if midplanes are used as described above, the cables connecting the first stage modules with the second stage modules and the cables connecting the fourth stage modules with the fifth stage modules can be eliminated. Thus, 16,384 cables can be used. Further, if each input connection and each output connection from the same input/output module are combined into a single cable (i.e., a 16 data connection cable), and each connection between each second stage module and each third stage module is combined with a connection between the third stage module and the fifth stage module on the same interface card as the first stage module (i.e., 32 data connection cables), the number of cables used can be reduced to 10,240.

Data (e.g., data cells) is transferred from a first input/output module of the input/output modules 402 to a second input/output module of the input/output modules 402 via the switch fabric system 400. The first input/output module 402 sends data into one of the first switch fabric portions 471 or one of the second switch fabric portions 473 via a cable of the first set of cables 440. The data passes through a cable connector port 460 of one of the interface cards 410 and into a module associated with a first stage of the switch fabric system 400 within a module system 412 or 414.

The module associated with the first stage forwards the data to one of the modules associated with the second stage of the switch fabric system 400. This is done by sending the data through one of the midplane connector ports 462 of the interface card 410', through the midplane 450, and to one of the interface cards 416 associated with the second stage and the fourth stage. The data is received at the interface card 416 through a midplane 480. The data is then sent to a module associated with the second stage within the module system 418 or 419.

The module associated with the second stage of the switch fabric system 400 determines to which third switch fabric portion 491 to send the data using, for example, a routing table and sends the data to a module associated with the retiming stage of the switch fabric system 400 within a module system 494, 495, 496 or 497 contained within the third switch fabric portion 491 via a cable connector port 482, a cable from the third set of cables 444, and a cable connector port 464. The module associated with the retiming stage sends the data to a module associated with a third stage within a module system 498 or 499 via the midplane connector ports 466, the midplane 451, and the midplane connector ports 484.

The module associated with the third stage determines how to send the data using, for example, a routing table and redirects the data back to the interface card 485, via the midplane 451. Because each module system 498, 499 (associated with the third stage of the switch fabric system 400) is operatively coupled to each module system 412, 414 (associated with the first stage and the fifth stage of the switch fabric system 400) via the module systems 494, 495, 496, 497 (associated with the retiming stage of the switch fabric system 400) and the module systems 418, 419 (associated with the second stage and the fourth stage of the switch fabric system 400), the module system 498, 499 associated with the third stage of the system 400 can use a routing table to ensure that the data is sent to a module system 412, 414 (associated with the first stage and the fifth stage of the switch fabric system 400) operatively coupled to the second input/output module. In such a manner, the data is sent from the module associated with the third stage to the second input/output module 402 via the module associated with the retiming stage within a module system 498 or 499, the module associated with the fourth stage within a module system 418 or 419 and the module associated with the fifth stage within a module system 412 or 414.

While the first stage of the switch fabric system 400 can send data to the second stage of the system 400, in some embodiments, the second stage cannot send data to the first stage. Similarly, in such an embodiment, the fifth stage cannot send data to the fourth stage, the fourth stage cannot send data to the third stage, and the third stage cannot send data to the second stage.

Figure 12:
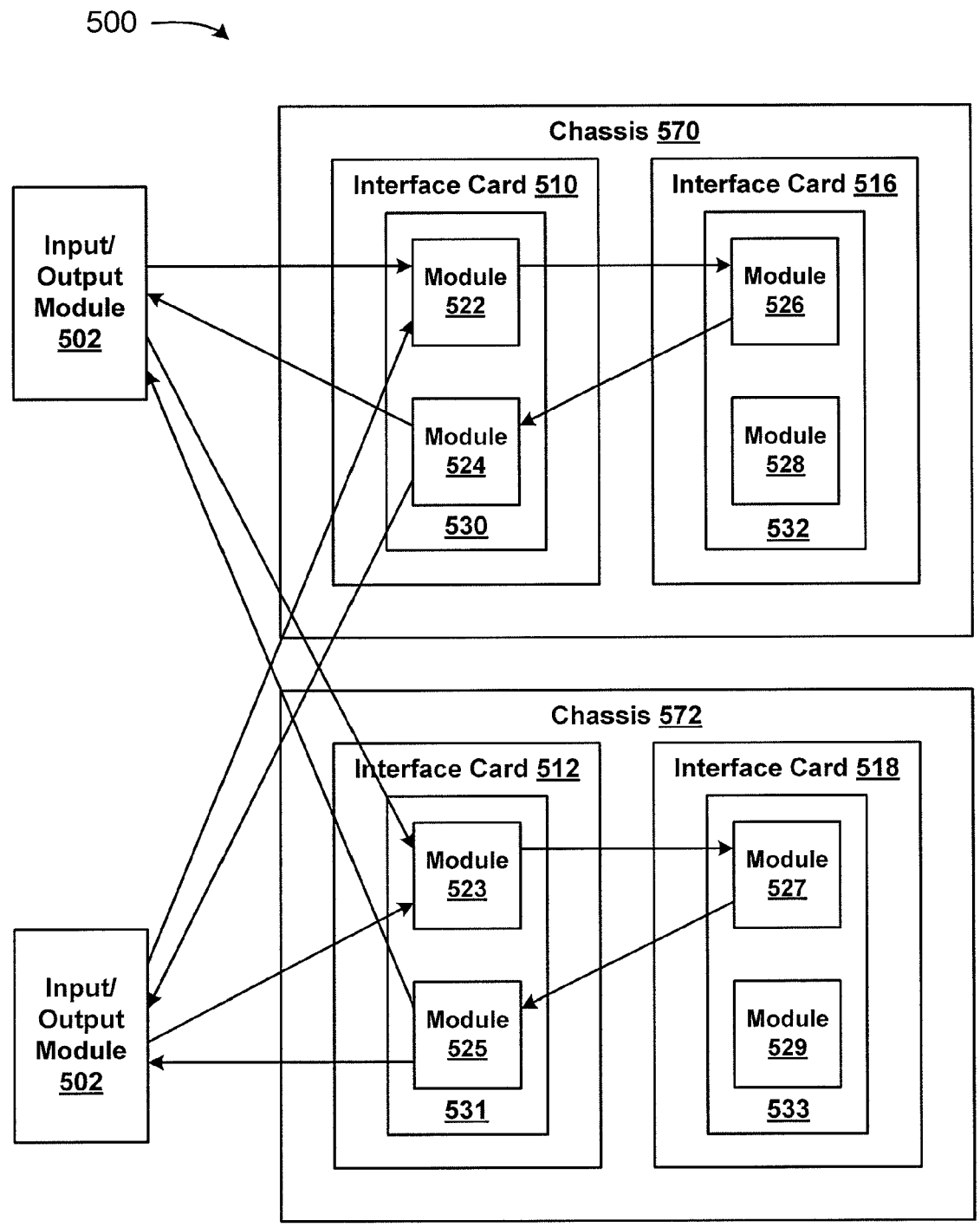
FIGS. 12-14 are schematic illustrations of a portion of a switch fabric system in a first configuration, a second configuration and a third configuration, respectively, according to another embodiment.
Figure 13:
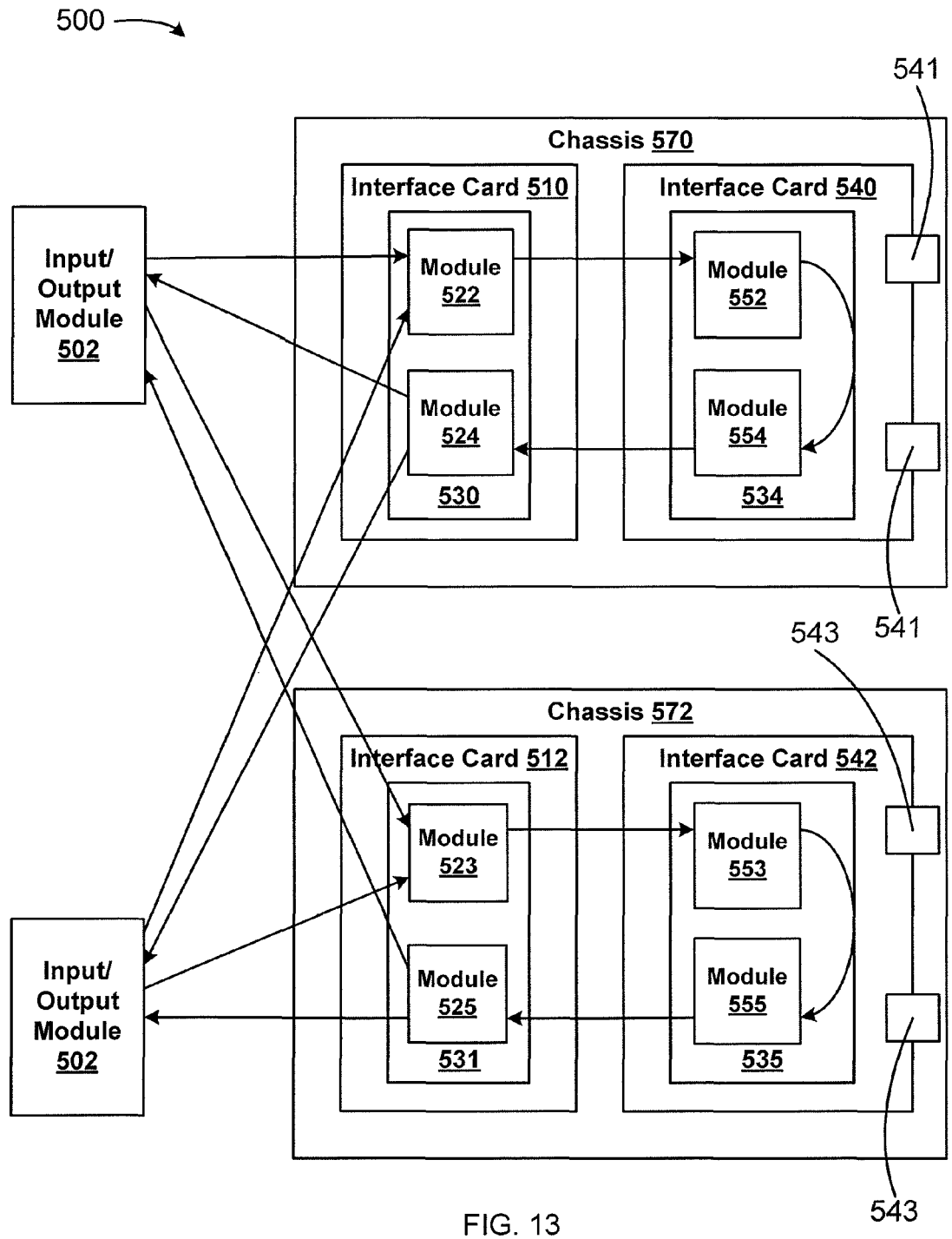
Figure 14:
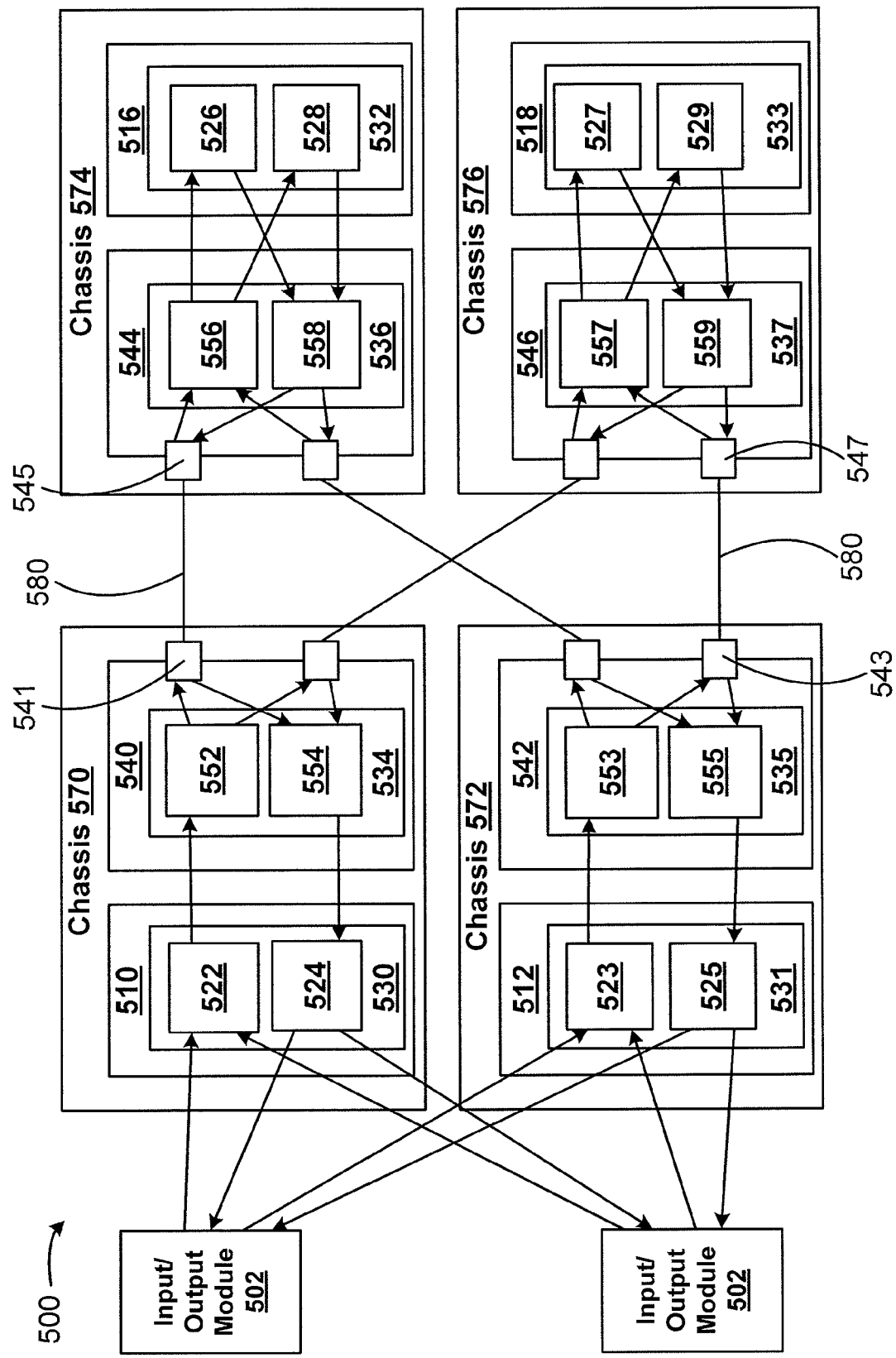

FIGS. 12-14 are schematic illustrations of a portion of a switch fabric system 500 in a first configuration, a second configuration and a third configuration, respectively, according to another embodiment. The first configuration, the second configuration and the third configuration illustrate configurations during a method of upgrading the switch fabric system 500 from a three-stage switch fabric to a five-stage switch fabric while maintaining operation of the switch fabric system 500. Specifically, the switch fabric system 500 operates as a three-stage switch fabric when in the first configuration. The second configuration is a transitional configuration in which the switch fabric system 500 continues to operate as a three-stage switch fabric but includes two modules that collectively operate as the second stage of the switch fabric system 500. The switch fabric system 500 operates as a five-stage switch fabric when in the third configuration. Such a method can be used, for example, to upgrade the three-stage switch fabric system 200 to the five-stage switch fabric system 400. The arrows shown in FIGS. 12-14 illustrate the various data connections within the switch fabric system 500.

When in the first configuration (FIG. 12), the switch fabric system 500 can be structurally and functionally similar to the switch fabric system 200. As such, the switch fabric system 500 includes multiple input/output modules 502, a first chassis 570, a second chassis 572 and multiple cables (not shown) operatively coupling the input/output modules 502 with the first chassis 570 and the second chassis 572. The input/output modules 502 can be similar to the input/output modules 202 shown and described above. While shown in FIG. 12 as having two input/output modules 502, the switch fabric system 500 can include any suitable number of input/output modules 502. As described above, in some embodiments, for example, the switch fabric system 500 can include between 128 and 4096 input/output modules 502. Similarly, the cables can be similar to the cables 240, 242, shown and described above.

The first chassis 570 can be similar to the chassis 270 shown and described above. As such, the chassis 570 includes multiple interface cards 510, 516 operatively coupled to each other via a midplane (not shown in FIGS. 12-14). While shown in FIG. 12 as having two interface cards 510, 516, the first chassis 570 includes any suitable number of interface cards. As described above, in some embodiments, for example, the first chassis 570 can include eight interface cards 510 on a first side of a midplane and eight interface cards 516 on the opposite side of the midplane.

Each interface card 510 includes at least one module system 530 having two modules 522, 524. Similarly, each interface card 516 includes at least one module system 532 having two modules 526, 528. While shown in FIG. 12 as having only a single module system 530, 532, the interface cards 530, 532 can include any number of module systems. As described above, an interface card can include, for example, two module systems. In the first configuration, the module 522 is associated with the first stage of the switch fabric, the module 524 is associated with the third stage of the switch fabric and the modules 526, 528 are associated with the second stage of the switch fabric.

The second chassis 572 is similar to the first chassis 570 and includes interface cards 512, 518 having module systems 531, 533, respectively. The module systems 531, 533 include modules 523, 525, 527, 529 associated with the various stages of the switch fabric system 500. For example, in the first configuration, the module 523 is associated with the first stage of the switch fabric, the module 525 is associated with the third stage of the switch fabric and the modules 527, 529 are associated with the second stage of the switch fabric.

In use, data is transferred from a first input/output module 502 to a second input/output module 502 via the first chassis 570. The first input/output module 502 sends data to the module 522 associated with the first stage of the switch fabric system 500 within the first chassis 570 via a cable. The module 522 sends the data to a module 526 associated with the second stage of the switch fabric system 500. The module 526 determines how to send the data using, for example, a routing table, and sends the data accordingly. Use of a routing table can ensure that the data is sent to a module 524 associated with the third stage to which the second input/output module 502 is operatively coupled. The module 524 then sends the data to the second input/output module 502. The data can be transferred from a first input/output module 502 to a second input/output module 502 via the second chassis 572 in a similar manner.

FIG. 13 is a schematic illustration of the switch fabric system 500 in the second configuration. The second configuration is an intermediate configuration (i.e., transitional configuration) as the switch fabric system 500 is being upgraded from the first configuration (FIG. 12) to the third configuration (FIG. 14). In the second configuration, the interface card 516 and the interface card 518 are replaced by the interface card 540 and the interface card 542, respectively.

The interface card 540 includes at least one module system 534 and cable connector ports 541. The cable connector ports 541 are each configured to receive an end portion of a cable 580 (see e.g., FIG. 14), as described in further detail herein. The module system 534 includes a module 552 and a module 554. The module 552 and the module 554 collectively operate as a module associated with the second stage of the switch fabric system 500 when in the second configuration.

Similarly, the interface card 542 includes at least one module system 535 and cable connector ports 543. The cable connector ports 543 are each configured to receive an end portion of a cable, as described in further detail herein. The module system 535 includes a module 553 and a module 555. The module 553 and the module 555 collectively operate as a module associated with the second stage of the switch fabric system 500 when in the second configuration.

In use, data is transferred from a first input/output module 502 to a second input/output module 502 via the first chassis 570. The first input/output module 502 sends data to the module 522 associated with the first stage of the switch fabric system 500 within the first chassis 570 via a cable (not shown in FIGS. 12-14). The module 522 sends the data to a module 552. The module 552 forwards the data to the module 554. Collectively, the module 552 and the module 554 are associated with the second stage of the switch fabric system 500. As such, the module 552 and/or the module 554 determines how to send the data using, for example, a routing table, and sends the data accordingly. Use of a routing table can ensure that the data is sent to a module 524 associated with the third stage of the switch fabric to which the second input/output module 502 is coupled. In some embodiments, the module 552 is a passive module. As such, the module 552 does not perform any switching functions and merely sends the data to the module 554. In such embodiments, the module 554 is an active switching module. The module 554 receives the data, determines how to send the data using the routing table, and sends the data accordingly (e.g., to the module 524). In other embodiments, the module 554 can be the passive module and the module 552 can be the switching module.

The module 524 then sends the data to the second input/output module 502. The data can be transferred from a first input/output module 502 to a second input/output module 502 via the second chassis 572 in a similar manner.

As discussed above, the switch fabric system 500 can be reconfigured from the first configuration (FIG. 12) to the second configuration (FIG. 13) by replacing the interface card 516 and the interface card 518 with the interface card 540 and the interface card 542, respectively. This can be done one card at a time. Accordingly, while one interface card 516 is being replaced, the other seven interface cards 516 within the first chassis 570 continue operating. Thus, the total fabric capacity of any one chassis (e.g., the first chassis 570 or the second chassis 572) is only reduced by 12.5% while reconfiguring the switch fabric system 500 from the first configuration to the second configuration.

In some embodiments, having two modules (e.g., module 552 and module 554) associated with the second stage of the switch fabric adds an additional 350 ns of extra latency to the switch fabric system 500 due to the extra time to transit the passive/inactive module (e.g., module 552 or module 554). Said another way, in such embodiments, it takes a data cell 350 ns longer to pass through the switch fabric system 500 when the switch fabric system 500 is in the second configuration than when the switch fabric system 500 is in the first configuration.

While in the process of reconfiguring the switch fabric system 500 from the first configuration to the second configuration, the switch fabric system 500 can include some interface cards 516 and some interface cards 540. For example, during the time the first chassis 570 is reconfigured, the first chassis 570 can include four interface cards 516 and four interface cards 540. Such a configuration can result in a latency mismatch of up to 350 ns. Said another way, if a data cell passes through the switch fabric via an interface card 516, it will pass through the switch fabric system 500 350 ns faster than a data cell that passes through the switch fabric system 500 via an interface card 540. In such embodiments, re-order buffers within the input/output modules 502 can account for the latency mismatch such that the data cells are received and placed in the correct order at a destination input/output module 502.

FIG. 14 is a schematic illustration of the switch fabric system 500 in the third configuration. In the third configuration, the switch fabric system 500 can operate as a five-stage switch fabric, as described in further detail herein. In the third configuration, a third chassis 574 and a fourth chassis 576 are operatively coupled to the first chassis 570 and the second chassis 572.

The third chassis 574 includes an interface card 544 associated with a retiming stage of the switch fabric system 500 having a module system 536 and cable connector ports 545. The cable connector ports 545 are each configured to receive an end portion of a cable 580, as described in further detail herein. The module system 536 includes a first module 556 and a second module 558 associated with the retiming stage of the switch fabric system 500. The retiming stage of the switch fabric system 500 is configured to retime and/or multiplex signals.

The third chassis 574 also includes the interface card 516 when the switch fabric system 500 is in the third configuration. The interface card 516 can be removed from the first chassis 570, in which the interface card 516 is disposed when the switch fabric system 500 is in the first configuration, and placed within the third chassis 532 when the switch fabric system 500 is in the third configuration. When the switch fabric system 500 is in the third configuration, the module 526 and the module 528 disposed within the module system 532 on the interface card 516 are associated with a third stage of the switch fabric system 500. While FIG. 14 shows the interface card 516 associated with the second stage when the switch fabric system 500 is in the first configuration as the same interface card 516 associated with the third stage when the switch fabric system 500 is in the third configuration, in other embodiments, these interface cards can be different interface cards.

Similarly, the fourth chassis 576 includes an interface card 546 associated with the retiming stage of the switch fabric system 500 having a module system 537 and cable connector ports 547. The cable connector ports 547 are each configured to receive an end portion of a cable 580, as described in further detail herein. The module system 537 includes a first module 557 and a second module 559 associated with the retiming stage. Additionally, the fourth chassis 576 includes the interface card 518 when the switch fabric system 500 is in the third configuration. The interface card 518 can be removed from the second chassis 572, in which the interface card 518 is disposed when the switch fabric system 500 is in the first configuration, and placed within the fourth chassis 576 when the switch fabric system 500 is in the third configuration. When the switch fabric system 500 is in the third configuration, the module 527 and the module 529 disposed within the module system 533 on the interface card 518 are associated with a third stage of the switch fabric system 500.

When in the third configuration, the switch fabric system 500 includes multiple cables 580 operatively coupling the first chassis 570 with the third chassis 574. The cables can be any suitable cables and can be similar to the cables 444, shown and described with respect to FIG. 8. Some of the cables 580 include a first end portion coupled to cable connector ports 547 of interface card 540 and a second end portion coupled to the cable connector ports 545 of interface card 544. In such a manner, these cables 580 operatively couple the first chassis 570 to the third chassis 574 such that data can be sent between the interface card 540 and the interface card 544. In a similar manner, some of the cables 580 operatively couple the first chassis 570 with the fourth chassis 576, and some of the cables 580 operatively couple the second chassis 572 with the third chassis 574 and the fourth chassis 576. Accordingly, the first chassis 570 is operatively coupled to the second chassis 572 via the cables 580 and the third chassis 574 and/or the fourth chassis 576.

When in the third configuration, the switch fabric system 500 can function similar to the switch fabric system 400, shown and described above. As such, data is transferred from a first input/output module 502 to a second input/output module 502 via the first chassis 570 (or the second chassis 572) and the third chassis 574 (or the fourth chassis 576). For example, the first input/output module 502 can send data to the module 522 associated with the first stage of the switch fabric system 500 within the first chassis 570 via a cable. The module 522 sends the data to a module 552 associated with the second stage of the switch fabric system 500. The module 552 sends the data to the module 556 associated with a retiming stage of the switch fabric system 500 via a cable 580. The module 556 sends the data to the module 526 (or the module 528) associated with the third stage of the switch fabric system 500. The module 526 determines how to send the data using, for example, a routing table, and sends the data accordingly. Use of a routing table can ensure that the data is sent to a module 554 associated with the fourth stage within the chassis 570, 572 to which the second input/output module 502 is coupled via a module 556 (or the module 558) associated with the retiming stage. The module 554 then sends the data to the module 524 associated with the fifth stage of the switch fabric system 500 which sends the data to the second input/output module 502. Accordingly, instead of operating collectively as a second stage of the switch fabric system 500, in the third configuration, the module 552 operates as a second stage of the switch fabric system 500 and the module 554 operates as a fourth stage of the switch fabric system 500. While described as transferring the data through the switch fabric system 500 using the first chassis 570 and the third chassis 574, in other embodiments, any of the chassis 570, 572, 574, 576 can be used. For example, the data can be transferred from a first input/output module 502 to a second input/output module 502 via the second chassis 572 and the fourth chassis 576.

As discussed above, the switch fabric system 500 can be reconfigured from the second configuration (FIG. 13) to the third configuration (FIG. 14). This can be done by inserting the interface cards 544, 516, 546, 518 into the third chassis 574 and the fourth chassis 576, respectively, and coupling the third chassis 574 and the fourth chassis 576 to the first chassis 570 and the second chassis 572 with cables. While an operator is coupling the chassis 570, 572, 574, 576 together with cables 580, the switch fabric system 500 continues to operate in the second configuration (FIG. 13). After the third chassis 574 and the fourth chassis 576 are coupled to the first chassis 570 and the second chassis 572, the physical and logical connections between the chassis 570, 572, 574, 576 are tested and verified.

A reconfiguration signal can then be sent to the modules 552, 554, 553 and 555. Such a reconfiguration signal can reconfigure the modules 552, 554, 553 and 555 to operate in the third configuration rather than the second configuration. The reconfiguration signal can be sent such that the modules 552, 554, 553 and 555 receive the reconfiguration signal at substantially the same time. Accordingly, the modules 552, 554, 553 and 555 switch from operating in the second configuration to operating in the third configuration at substantially the same time. In some embodiments, for example, the modules 552, 554, 553 and 555 can switch from the second configuration to the third configuration in approximately 10-100 ns. This reduces the possibility of data loss due to timing mismatch that can occur with some modules operating in the second configuration and some modules operating in the third configuration.

In some embodiments, the reconfiguration signal can be sent from at least one input/output module 502 to the modules 552, 554, 553 and 555. Because each input/output module 502 is coupled to both the first chassis 570 and the second chassis 572, the input/output module 502 can send the reconfiguration signal to the first chassis 570 at the same time it sends the reconfiguration signal to the second chassis 572. In embodiments where the length of the cable between the input/output module 502 and the first chassis 570 is substantially equal to the length of the cable between the input/output module 502 and the second chassis 570, the module 522 can receive the reconfiguration signal at substantially the same time as the module 523. In other embodiments, the lengths of the cables are not substantially equal. In such embodiments, the input/output module 502 can delay sending the reconfiguration signal through the shorter cable such that the modules 522, 523 receive the reconfiguration signal at substantially the same time. In other embodiments, a processor associated with a control plane of the switch fabric system sends the reconfiguration signal to the first chassis and/or the second chassis. In still other embodiments, a processor associated with a control plane of the switch fabric system sends the reconfiguration signal to at least one input/output module, which then sends the reconfiguration signal to the first chassis and the second chassis. While both the first chassis 570 and the second chassis 572 receive and process the reconfiguration signal, the method of reconfiguring the switch fabric system 500 using the reconfiguration signal is described with respect to reconfiguring the first chassis 570. A similar process is used to reconfigure the second chassis 572.

The module 522 associated with the first stage can receive the reconfiguration signal from the input/output module 502. Receipt of the reconfiguration signal can cause an interrupt to occur at the module 522. In embodiments where the interface card 510 includes more than one module system 530, each module 522 associated with the first stage of the switch fabric system 500 on the interface card 510 can receive the reconfiguration signal. In such embodiments, the reconfiguration signals received by the modules 522 on the interface card 510 can be combined using a processor (e.g., a complex programmable logic device (CPLD) or any other suitable processor) on the interface card 510 and sent to a control board within the chassis 570.

A processor (e.g., a CPLD) on the control board within the chassis 570 receives the reconfiguration signals from each interface card 510 within the chassis 570. For example, if the chassis 570 includes eight interface cards 510, the control board will receive eight reconfiguration signals. In some embodiments, more than one control board is used. In such embodiments, both control boards can receive the reconfiguration signals. As long as a single reconfiguration signal is received by the processor, the processor on the control board can send the reconfiguration signal to a processor on the interface card 540 which sends the reconfiguration signal to the modules 552 and 554. The modules 552 and 554 can receive the reconfiguration signal and accordingly switch from operating in the second configuration to operating in the first configuration. In some embodiments, for example, the reconfiguration signal is received as an interrupt on a dedicated pin on a chip package of the modules 552 and 554. Because all of the modules 552, 554, 553, 555 within the switch fabric system 500 can receive the reconfiguration signal at substantially the same time, packet loss due to fabric multi-path latency differences can be prevented. Additionally, this allows the switch fabric system 500 to be reconfigured from the second configuration to the third configuration while maintaining operation.

In other embodiments, the reconfiguration signal can be sent to one interface card 534, 535 at a time (i.e., one interface card 540, 542 can be switched to the third configuration at a time). Accordingly, in embodiments where the first chassis 570 includes eight interface cards 540, while one interface card 540 is being reconfigured, the other seven interface cards 540 within the first chassis 570 continue operating. Thus, the total fabric capacity of any one chassis (e.g., the first chassis 570 or the second chassis 572) is only reduced by 12.5% while reconfiguring the switch fabric system 500 from the second configuration to the third configuration. In such embodiments, it takes a data cell approximately 1.5 μs longer to pass through the switch fabric system 500 when the switch fabric system 500 is in the third configuration than when the switch fabric system 500 is in the second configuration.

In such embodiments, while in the process of reconfiguring the switch fabric system 500 from the second configuration to the third configuration, the switch fabric system 500 can include some interface cards 540 operating in the second configuration and some interface cards 540 operating in the third configuration. For example, during the time the first chassis 570 is reconfigured, the first chassis 570 can include four interface cards 540 operating in the second configuration and four interface cards 540 operating in the third configuration. Such a configuration can result in a latency mismatch of up to 1.5 μs. Said another way, if a data cell passes through the switch fabric via an interface card 540 operating in the second configuration, it will pass through the switch fabric 1.5 μs faster than a data cell that passes through the switch fabric via an interface card 540 operating in the third configuration. In such embodiments, re-order buffers within the input/output modules 502 can account for the latency mismatch such that the data cells are received and placed in the correct order at a destination input/output module 502.

While the system 500 is shown in FIGS. 12-14 as having two chassis in the first configuration and the second configuration and four chassis in the third configuration, in some embodiments, any number of chassis can be used. For example, as described above, multiple three-stage switch fabric systems 200 (FIGS. 2-4) having two chassis can be upgraded to the five-stage switch fabric system 400 (FIGS. 8-11) having 96 chassis using the method shown and described with reference to FIGS. 12-14. Such an upgrade can be used to increase the number of input/output modules 502 from 128 to 4096. Moreover, as discussed above, each input/output module 502 can be coupled to multiple peripheral devices (e.g., servers, storage devices, workstations, etc.). In some embodiments, for example, if each input/output module 502 is coupled to 48 peripheral devices, the switch fabric system 500 can include 196,608 peripheral devices. In other embodiments, any number of peripheral devices can be coupled to each input/output modules.

While switch fabric systems are shown and described with respect to FIGS. 1-14, it should be understood that only a portion of the switch fabric systems are shown in FIGS. 1-14. For example, as described above, while FIG. 8 shows eight of the input/output modules 402 in the switch fabric system 400, the switch fabric system 400 can include any number of input/output modules 402. In some embodiments, for example, the switch fabric system can include 4096 input/output modules 402. For another example, while FIG. 10 shows two interface cards 410' and 416' in a chassis, any number of interface cards 410, 416 can be disposed within the chassis. In some embodiments, for example, each chassis includes eight interface cards 410 and eight interface cards 416. For yet another example, for purposes of clarity, not all of the connections between the module systems and the and the cable connector ports and the midplane connector ports are shown in the figures. For example, as discussed above, the 1st/3rd stage module system 212 of FIG. 4 is operatively coupled to eight cable connector ports 260 (only two connections are shown in FIG. 4) and to eight midplane connector ports 262 (only two connections are shown in FIG. 4). Such an arrangement is also true for the other module systems shown and described with respect to FIGS. 4, 10 and 11.

Figure 15:
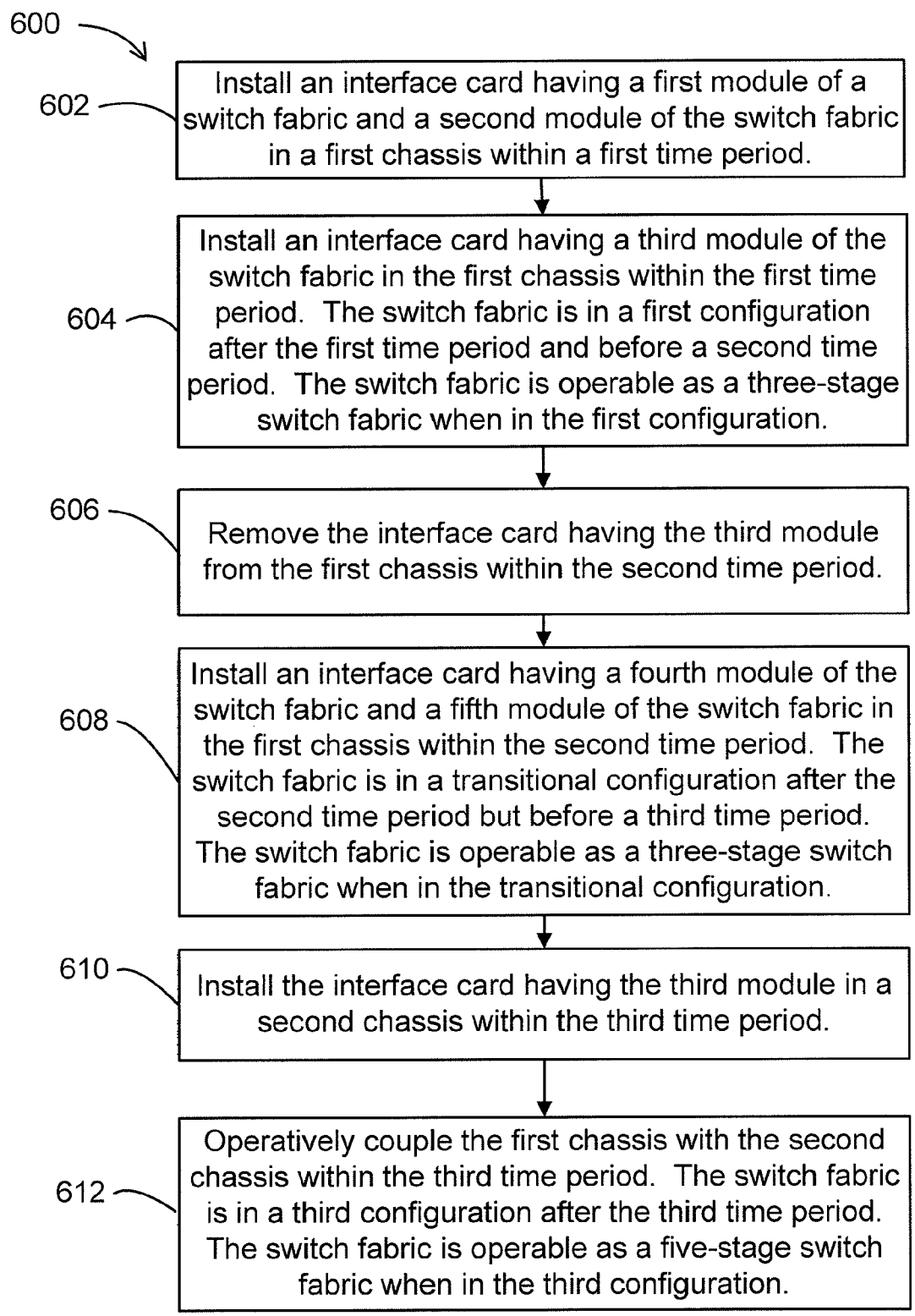
FIG. 15 is a flow chart illustrating a method of upgrading a switch fabric system, according to another embodiment.

FIG. 15 is a flow chart illustrating a method 600 of upgrading a switch fabric, according to another embodiment. The method 600 includes installing an interface card having a first module of a switch fabric and a second module of the switch fabric in a first chassis within a first time period, at 602. The interface card, the first module and the first chassis can be similar to the interface cards, the modules and the chassis shown and described above.

An interface card having a third module of the switch fabric is installed in the first chassis within the first time period, at 604. The switch fabric is in a first configuration after the first time period and before a second time period. The switch fabric is operable as a three-stage switch fabric when in the first configuration.

The interface card having the third module is removed from the first chassis within the second time period, at 606. An interface card having a fourth module of the switch fabric and a fifth module of the switch fabric is installed in the first chassis within the second time period, at 608. The switch fabric is in a transitional configuration after the second time period but before a third time period. The switch fabric is operable as a three-stage switch fabric when in the transitional configuration.

The interface card having the third module is installed in a second chassis within the third time period, at 610. The first chassis is operatively coupled with the second chassis within the third time period, at 612. The switch fabric is in a third configuration after the third time period. The switch fabric is operable as a five-stage switch fabric when in the third configuration.

An interface card having a sixth module of the switch fabric is optionally installed in a third chassis within the first time period. The sixth module operates independent from the first module when the switch fabric is in the first configuration. The sixth module is operatively coupled to the first module via the third module when the switch fabric is in the third configuration.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

For example, while the systems and methods described above have been described in relation to a rearrangeably non-blocking Clos network (e.g., a Benes network), the systems and methods can be used with any type of switch fabric and/or network.

In some embodiments, each cable connector port, each midplane connector port, each cable and/or each midplane described above can have any bandwidth appropriate to send data through the switch fabric. For example, each cable can have eight data connections, sixteen data connections, thirty-two data connections and/or the like. Similarly, each cable connector port, each midplane connector port, and/or each midplane can have eight data connections, sixteen data connections, thirty-two data connections and/or the like. In some embodiments, each cable connector port, each midplane connector port, each cable and/or each midplane do not all have the same number of data connections. In other embodiments, each cable connector port, each midplane connector port, each cable and/or each midplane have the same number of data connections.

In other embodiments, for example, a switch fabric system can have any number of stages. For example, while the switch fabric systems discussed herein have three or five stages, in other embodiments, the switch fabric system can have seven, nine, eleven, or more stages. This allows the switch fabric system to expand to include additional input/output modules. Additionally, a larger switch fabric system is capable of transferring greater amounts of data.

While the systems shown and described above use a midplane to operatively couple a first set of interface cards to a second set of interface cards within a housing, in other embodiments, a midplane is not needed. For example, in some embodiments, each interface card from the first set of interface cards directly interfaces with each interface card from the second set of interface cards. In some embodiments, for example, a given interface card from the first set of interface cards can be directly coupled to eight interface cards from the second set of interface cards. Similarly, a given interface card from the second set of interface cards can be directly coupled to eight interface cards from the first set of interface cards. In such embodiments, each interface card from the first set of interface cards can send data to each interface card from the second set of interface cards without using a midplane and/or cables.

In other embodiments, free space optics can be used instead of a midplane to operatively couple a first set of interface cards to a second set of interface cards within a housing. In such embodiments, for example, each interface card can include multiple light sources, such as, for example, vertical-cavity surface-emitting lasers (VCSELs) and multiple light sensors, such as, for example, a PIN array containing multiple PIN diodes. A light source on an interface card from the first set of interface cards is aligned with a light sensor on an interface card from the second set of interface cards, and vice versa. In some embodiments, for example, each of eight light sources on an interface card from the first set of interface cards can be aligned with a light sensor from each of eight interface cards from the second set of interface cards. Similarly, each of eight light sources on an interface card from the second set of interface cards can be aligned with a light sensor from each of eight interface cards from the first set of interface cards. Accordingly, using free space optics, data can be transferred between the first set of interface cards and the second set of interface cards without using a midplane, cables (including optical connectors or fibers) and/or the like.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. For example, where a specific number of modules, interface cards and/or connections has been described, any suitable number of modules, interface cards and/or connections can be used, Further, in any of the described embodiments, modules of each stage of the switch fabric can be within a separate interface card and/or a separate ASIC within an interface card. In other embodiments, multiple stages and/or modules can be included on the same interface card and/or ASIC. Additionally, any of the data paths and/or cables can have any suitable bandwidth.

What is claimed is:

1. A method, comprising:
   installing an interface card having a first module of a switch fabric and a second module of the switch fabric in a first chassis within a first time period;
   installing an interface card having a third module of the switch fabric in the first chassis within the first time period, the switch fabric being in a first configuration after the first time period and before a second time period, the switch fabric being operable as a three-stage switch fabric when in the first configuration;
   removing the interface card having the third module from the first chassis within the second time period;
   installing an interface card having a fourth module of the switch fabric and a fifth module of the switch fabric in the first chassis within the second time period, the switch fabric being in a transitional configuration after the second time period but before a third time period, the switch fabric being operable as a three-stage switch fabric when in the transitional configuration;
   installing the interface card having the third module, which was removed from the first chassis, in a second chassis within the third time period, the third module being associated with a second stage of the switch fabric when the switch fabric is in the first configuration, the third module being associated with a third stage of the switch fabric when the switch fabric is in a third configuration; and
   operatively coupling the first chassis with the second chassis within the third time period, the switch fabric being in the third configuration after the third time period, the switch fabric being operable as a five-stage switch fabric when in the third configuration.

2. The method of claim 1, wherein the switch fabric transitions from the second configuration to the third configuration in response to the fourth module and the fifth module receiving a reconfiguration signal.

3. The method of claim 1, wherein the second module is associated with a third stage of the switch fabric when the switch fabric is in the first configuration, the second module being associated with a third stage of the switch fabric when the switch fabric is in the second configuration, the second module being associated with a fifth stage of the switch fabric when the switch fabric is in the third configuration.

4. The method of claim 1, wherein the switch fabric can be reconfigured from the second configuration to the third configuration while maintaining operation.

5. The method of claim 1, further comprising:
   installing an interface card having a sixth module of the switch fabric in a third chassis within the first time period, the sixth module operating independent from the first module when the switch fabric is in the first configuration, the sixth module being operatively coupled to the first module via the third module when the switch fabric is in the third configuration.

6. The method of claim 1, wherein the installing the interface card having the third module in the second chassis is performed while the switch fabric operates in the second configuration.

7. The method of claim 1, wherein the fourth module and the fifth module operate collectively as a second stage of the switch fabric when the switch fabric is in the second configuration, the fourth module operating as the second stage of the switch fabric and the fifth module operating as the fourth stage of the switch fabric when the switch fabric is in the third configuration.

8. A system, comprising:
   a multi-stage switch defining a single logical entity and having a first configuration, a second configuration and a third configuration,
   the multi-stage switch having (1) a first chassis having a module operating as a first stage, (2) a module operating as a second stage and (3) a module operating as a third stage of the multi-stage switch, when the multi-stage switch is in the first configuration, the multi-stage switch configured to operate as a three-stage switch when in the first configuration, the first chassis having (1) a module operating as the first stage, (2) at least two modules operating collectively as the second stage, such that one of the at least two modules operating collectively as the second stage sends a data cell through the remaining module from the at least two modules operating collectively as the second stage, and (3) a module operating as the third stage of the multi-stage switch, when the multi-stage switch is in the second configuration, the multi-stage switch configured to operate as a three-stage switch when in the second configuration, the multi-stage switch having a second chassis having a module operating as the third stage of the multi-stage switch when the multi-stage switch is in the third configuration, the first chassis having (1) a module operating as the first stage, (2) a module operating as the second stage, (3) a module operating as a fourth stage and (4) a module operating as a fifth stage of the multi-stage switch, when the multi-stage switch is in the third configuration, the multi-stage switch configured to operate as a five-stage switch when in the third configuration.

9. The system of claim 8, wherein the multi-stage switch can be reconfigured from the second configuration to the third configuration while maintaining operation.

10. The system of claim 8, wherein the multi-stage switch in the third configuration has at least one cable interconnecting the first chassis with the second chassis.

11. The system of claim 8, wherein the multi-stage switch includes a third chassis when in the third configuration, the third chassis having a module operating as the first stage, a module operating as the second stage, a module operating as the fourth stage and a module operating as the fifth stage of the multi-stage switch, the third chassis being interconnected with the second chassis by at least one cable.

12. The system of claim 8, wherein the multi-stage switch transitions from the second configuration to the third configuration in response to the at least two modules operating as the second stage of the multi-stage switch in the second configuration receiving a reconfiguration signal.

13. The system of claim 8, wherein the module operating as the third stage when the multi-stage switch is in the first configuration is the module operating as the third stage when the multi-stage switch is in the second configuration and the module operating as the fifth stage when the multi-stage switch is in the third configuration.

14. The system of claim 8, wherein the module operating as the second stage when the multi-stage switch is in the first configuration is the module operating as the third stage when the multi-stage switch is in the third configuration.

15. A method, comprising:
sending a first data cell to an access switch via a switch fabric during a first time period, the switch fabric being in a first configuration during the first time period, the switch fabric including (1) a module operating as a first stage, (2) a module operating as a second stage and (3) a module operating as a third stage, when in the first configuration, the switch fabric operating as a three-stage switch when in the first configuration;

sending a second data cell to the access switch via the switch fabric during a second time period, the switch fabric being in a second configuration during the second time period, the switch fabric including (1) a module operating as the first stage, (2) at least two modules operating collectively as the second stage, such that one of the at least two modules operating collectively as the second stage sends the second data cell through the remaining module from the at least two modules operating collectively as the second stage, and (3) a module operating as the third stage, when in the second configuration, the switch fabric operating as a three-stage switch when in the second configuration;

sending a third data cell to the access switch via the switch fabric during a third time period, the switch fabric being in a third configuration during the third time period, the switch fabric including (1) a module operating as the first stage, (2) a module operating as the second stage, (3) a module operating as the third stage, (4) a module operating as a fourth stage and (5) a module operating as a fifth stage, when in the third configuration, the switch fabric operating as a five-stage switch when in the third configuration.

16. The method of claim 15, further comprising:
sending a reconfiguration signal when the switch fabric is in the second configuration to the module operating as the second stage and the module operating as the third stage between the second time period and the third time period, the switch fabric transitioning from the second configuration to the third configuration in response to the module operating as the second stage and the module associated with the third stage when the switch fabric is in the second configuration receiving the reconfiguration signal.

17. The method of claim 15, wherein the access switch is a first access switch, the method further comprising:
sending a fourth data cell to a second access switch during the third time period, the second access switch operating independently from the first access switch when the switch fabric is in the first configuration and the second configuration, the second access switch being operatively coupled to the first access switch via the switch fabric when the switch fabric is in the third configuration.

18. The method of claim 15, wherein the module operating as the first stage, the at least two modules collectively operating as the second stage and the module operating as the third stage when the switch fabric is in the second configuration are within a single chassis.

19. The method of claim 15, wherein:
the module operating as the third stage when the switch fabric is in the first configuration is within a first chassis, and
the module operating as the third stage when the switch fabric is in the third configuration is within a second chassis.

* * * * *